(12) United States Patent
Quandel et al.

(10) Patent No.: US 8,190,466 B2
(45) Date of Patent: May 29, 2012

(54) METHODS AND SYSTEMS FOR IDENTIFYING SAFE HAVENS FOR HAZARDOUS TRANSPORTS

(75) Inventors: Charles H. Quandel, Chicago, IL (US); Douglas Wayne Morrison, Cameron, MO (US); Jeffrey L. Siegel, Chicago, IL (US); W. Robert Moore, Naperville, IL (US); Glen Arthur Herman, Olathe, KS (US); Robert J. Marros, Chicago, IL (US); Alex Kavanagh, Chicago, IL (US)

(73) Assignee: HNTB Holdings Ltd, Kansas City, MO (US)

( * ) Notice: Subject to any disclaimer, the term of this patent is extended or adjusted under 35 U.S.C. 154(b) by 1414 days.

(21) Appl. No.: 11/530,894

(22) Filed: Sep. 11, 2006

(65) Prior Publication Data

US 2007/0024468 A1  Feb. 1, 2007

Related U.S. Application Data

(63) Continuation-in-part of application No. 11/336,499, filed on Jan. 20, 2006.

(60) Provisional application No. 60/645,655, filed on Jan. 21, 2005.

(51) Int. Cl.
 *G06Q 99/00* (2006.01)
(52) U.S. Cl. ..................................... 705/7.28
(58) Field of Classification Search .............. 705/7, 10, 705/7.28
 See application file for complete search history.

(56) References Cited

U.S. PATENT DOCUMENTS

| | | | |
|---|---|---|---|
| 5,793,882 A | 8/1998 | Piatek | |
| 5,900,825 A | 5/1999 | Pressel et al. | |
| 6,775,613 B2* | 8/2004 | Burt et al. | 701/213 |
| 7,308,388 B2 | 12/2007 | Beverina et al. | |
| 2003/0135304 A1* | 7/2003 | Sroub et al. | 701/1 |

(Continued)

FOREIGN PATENT DOCUMENTS

WO  2006071227 A1  7/2006

OTHER PUBLICATIONS

Samina T. Panwhar, et al., "Development of a GIS-Based Hazardous Material Transportation Management System," University Transportation Center for Alabama (2000).*

(Continued)

*Primary Examiner* — Neil Kardos
(74) *Attorney, Agent, or Firm* — Shook, Hardy & Bacon L.L.P.

(57) ABSTRACT

The identification of safe havens for hazardous material transports is provided. Safe havens include locations at which a hazardous material transport is less susceptible to an event that may result in a hazardous material release and/or a location at which the impact of a hazardous material release is reduced. When an event occurs indicating that hazardous material transports should be moved to safe havens, the locations of hazardous material transports are determined. Safe havens may then be determined for each hazardous material transport. In some cases, safe havens may be selected from a group of predetermined locations designated as safe havens. In some cases, locations may be dynamically designated as safe havens for hazardous material transports after the occurrence of an event. The hazardous material transports are then moved to the selected safe havens, thereby reducing their susceptibility to events and/or minimizing the impact of an event that involves a hazardous material transport.

3 Claims, 28 Drawing Sheets

U.S. PATENT DOCUMENTS

| | | |
|---|---|---|
| 2004/0015336 A1 | 1/2004 | Kulesz |
| 2005/0043037 A1* | 2/2005 | Ioppe et al. ............... 455/456.1 |
| 2005/0086227 A1 | 4/2005 | Sullivan et al. |
| 2006/0020789 A1 | 1/2006 | Gipps et al. |

OTHER PUBLICATIONS

Roberto Bubbico, et al., "Risk Analysis for Road and Rail Transport of Hazardous Materials: A GIS Approach," 17 Journal of Loss Prevention in the Process Industries 483-488 (2004).*

Vedat Verter and Bahar Y. Kara, "A GIS-Based Framework for Hazardous Materials Transport Risk Assessment," 21 Risk Analysis 1109-1120 (2001).*

Michael E. Hodgson, et al., "Development of a Geographic Visualization and Communications Systems for Monitoring Remote Vehicles" (1998).*

49 C.F.R. 397 (1999).*

PCT Application No. PCT/US07/00498 Search Report dated Feb. 29, 2008.

PCT Search Report dated Mar. 19, 2008 for corresponding Appl. No. PCT/US07/00318 filed Mar. 19, 2008.

Anderson, Michael D. "Development of a GIS-Based Hazardous Materials Transportation Management System". University of Alabama at Birmingham. Tuscaloosa: University Transportation Center for Alabama, 2000. i-36.

Husdal, Jan. "The Reliability and Vulnerability of Transportation Lifelines". The Supply Chain Risk Management Blog. Apr. 25, 2002. Molde University College, Molde, Norway. Jul. 10, 2008; http://www.husdal.com.

Kim, Sigon. "Development of Risk Assessment Decision Support System for Hazardous Materials Movement". Diss. Virginia Polytechnic Institute and State Univ., 1991. Jul. 9, 2008; http://proquest.umi.com.

U.S. Military Uses GIS for Transportation Logistics and Real-Time Tracking, ArcNews, Fall 2005, p. 22, vol. 27 No. 3, ESRI, Redlands, California, U.S.A.

GIS in the Defense and Intelligence Communities, vol. 2, pp. 18-35, ESRI, Redlands, California, U.S.A., www.esri.com/industries/defense/files/gis_def_army_vol2.pdf.

Computer-Aided Management of Emergency Operations (CAMEO®), United States Environmental Protection Agency, http://ww.epa.gov/ceppo/cameo/what.htm.

Hazus, FEMA's Software Program for Estimating Potential Losses from Disasters, FEMA, http://www.fema.gov/plan/prevent/hazus/index.shtm.

* cited by examiner

METHODS AND SYSTEMS FOR IDENTIFYING SAFE HAVENS FOR HAZARDOUS TRANSPORTS

CROSS-REFERENCE TO RELATED APPLICATIONS

This application is a continuation-in-part of U.S. application Ser. No. 11/336,499, filed Jan. 20, 2006, which claims the benefit of U.S. Provisional Application No. 60/645,655, filed Jan. 21, 2005. Each of the aforementioned applications is herein incorporated by reference in its entirety.

STATEMENT REGARDING FEDERALLY SPONSORED RESEARCH OR DEVELOPMENT

Not applicable.

TECHNICAL FIELD

Embodiments of the present invention relate to facilitating the evaluation of security risks and the risk assessment and management associated with linear corridors, such as transportation corridors and utility corridors, for example. More particularly, embodiments relate to methods and systems for providing detailed geographic, demographic, environmental, and other types of information for evaluating and assessing risks associated with linear corridors and facilitating the development of mitigation strategies and event response for those risks.

BACKGROUND

In the wake of the September 11th terrorist attacks on the United States, an increased importance has been placed on ensuring security. As a result, strides have been made by both the government and private sectors to reduce the risk of security threats. Despite these efforts, there remain many areas with a significant exposure to potentially devastating terrorist attacks.

In particular, linear corridors present an area that may be exposed to a significant threat of terrorist activities. Such linear corridors may include transportation corridors, such as rail, roadway, and waterway corridors, as well as utility corridors, such as electric and gas corridors, for example. The nature of such linear corridors contributes to the risk of devastating terrorist activities. For example, the open infrastructure and accessibility of many linear corridors provide significant opportunities for attack. In addition, linear corridors often intersect with densely populated and urbanized areas, potentially increasing the devastation of any such terrorist attack.

For example, the movement of hazardous material along freight rail corridors or roadway corridors through dense urban environments presents a potential target for terrorist activities. Billions of tons of hazardous materials are shipped annually by various modes of transportation. Many of these hazardous materials include toxic inhalation hazard (TIH) chemicals. A terrorist attack of freight cars carrying TIH chemicals through a densely populated area would endanger many lives.

Accordingly, there is a need for efficient systems and methods for evaluating and assessing security risks of linear corridors by providing detailed geographic, demographic, environmental, and other types of information. Additionally, it would be beneficial if such systems and methods further facilitated the development of mitigation and response strategies for identified security risks.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems, methods, and user interfaces for providing detailed information for assessing security risks associated with linear corridors and facilitating the development of mitigation and event response strategies for those security risks. Accordingly, in one aspect, an embodiment of the present invention is directed to a method of assessing security risks. The method includes selecting a site for evaluation. The method also includes surveying the site and gathering information about the site, as well as an area around the site. The method further includes combining the collected survey data with the information gathered about the site and the area around the site. The method still further includes assessing the security risks of the site using the combined collected survey data and the information gathered about the site and the area around the site.

In another aspect, an embodiment of the present invention relates to a method of assessing security risks associated with a linear corridor. The method includes selecting a linear corridor for evaluation. The method also includes surveying the linear corridor and gathering context sensitive information associated with the linear corridor. The method further includes combining the survey data and context sensitive information. The method still further includes assessing security risks of the linear corridor using the combined survey data and context sensitive information.

In yet another aspect of the invention, an embodiment is directed to a method, implementable at least in part in a computing environment, for assessing security risks associated with a linear corridor. The method includes accessing information associated with the linear corridor, wherein the information includes combined survey data and context sensitive information associated with the linear corridor. The method also includes presenting the information associated with the linear corridor in a user interface, thereby allowing a user to view the linear corridor in the context of the information. The method further includes assessing the security risks associated with the linear corridor using the combined survey data and context sensitive information.

In a further aspect of the present invention, an embodiment relates to one or more computer-readable media having computer-useable instructions embodied thereon for providing one or more user interfaces for facilitating the assessment of security risks for one or more linear corridors. The one or more user interfaces include a navigation window and an attributes area. The navigation window is configured to present geospatial data for an area associated with one or more linear corridors. In addition, the navigation window is configured to allow a user to navigate the area. The attributes area is configured to present information associated with the one or more linear corridors. In addition, at least one of the navigation window and the attributes area are further configured to present risk assessment information associated with the one or more linear corridors.

In still a further aspect, an embodiment of the invention is directed to one or more computer-readable media having a data structure embodied thereon. The data structure is provided for facilitating the assessment of security risks. The data structure includes a spatial data model containing spatial data describing one or more linear corridors, which include one or more critical assets. The spatial data model also includes data defining an asset class and one or more asset attributes for each of the critical assets. The data structure also includes a risk factor data model containing data representing a plurality of risk factors, wherein at least a portion of the plurality of risk factors may be used to determine a baseline risk for at least one of the critical assets. The data structure further includes a core risk data model containing core risk data for determining a core risk for the at least one of the critical assets, wherein the core risk is determined using the baseline risk for the at least one of the critical assets.

In another aspect of the invention, an embodiment is directed to a method for identifying safe havens for hazardous material transports. The method includes gathering context sensitive information associated with at least one linear corridor. The method also includes assessing security risks of the linear corridor using at least a portion of the context sensitive information. The method further includes identifying one or more locations along the at least one linear corridor as one or more safe havens for hazardous material transports based at least in part on the assessed security risks of the linear corridor.

In yet another embodiment, the present invention is directed to a method for providing a safe haven for a hazardous material transport in response to an event. The method includes providing a data store including data representative of one or more safe havens, the data including, for each safe haven, one or more characteristics of the safe haven including a location of the safe haven. The method also includes determining a location of the hazardous material transport. The method further includes selecting one of the safe havens based at least in part on the location of the hazardous material transport. The method still further includes moving the hazardous material transport to the selected safe haven.

In still another aspect of the present invention, an embodiment is directed to a method for providing a safe haven for a hazardous material transport in response to an event. The method includes determining a location of the hazardous material transport. The method also includes accessing information associated with linear corridors, wherein the information includes context sensitive information associated with the linear corridors. The method further includes assessing security risks associated with the linear corridors using at least a portion of the context sensitive information. The method also includes identifying a location along the linear corridors as a safe haven for the hazardous material transport, wherein the location is identified as a safe haven based at least in part on the assessed security risks associated with the linear corridors and the location of the hazardous material transport. The method still further includes moving the hazardous material transport to the identified safe haven.

In a further embodiment, the present invention is directed to a computerized system for facilitating moving hazardous material transports to safe havens in response to an event. The system includes one or more data stores including data representative of one or more safe havens, the data including one or more characteristics of the safe havens including a location for each of the safe havens. The system also includes a hazardous material transport location component for determining the location of at least one hazardous material transport. The system further includes a safe haven selection component for selecting a safe haven for the hazardous material transport based at least in part on the location of the hazardous material transport and at least one characteristic of the one or more safe havens.

In still a further aspect of the invention, an embodiment is directed to one or more computer-readable media having a data structure embodied thereon, the data structure for facilitating the determination of a safe haven for a hazardous material transport. The data structure includes a first data field containing data representative of an identification of a safe haven and a second data field containing data representative of at least one characteristic of the safe haven.

BRIEF DESCRIPTION OF THE SEVERAL VIEWS OF THE DRAWING

Illustrative embodiments of the present invention are described in detail below with reference to the attached drawing figures, wherein.

DETAILED DESCRIPTION

Figure 1:
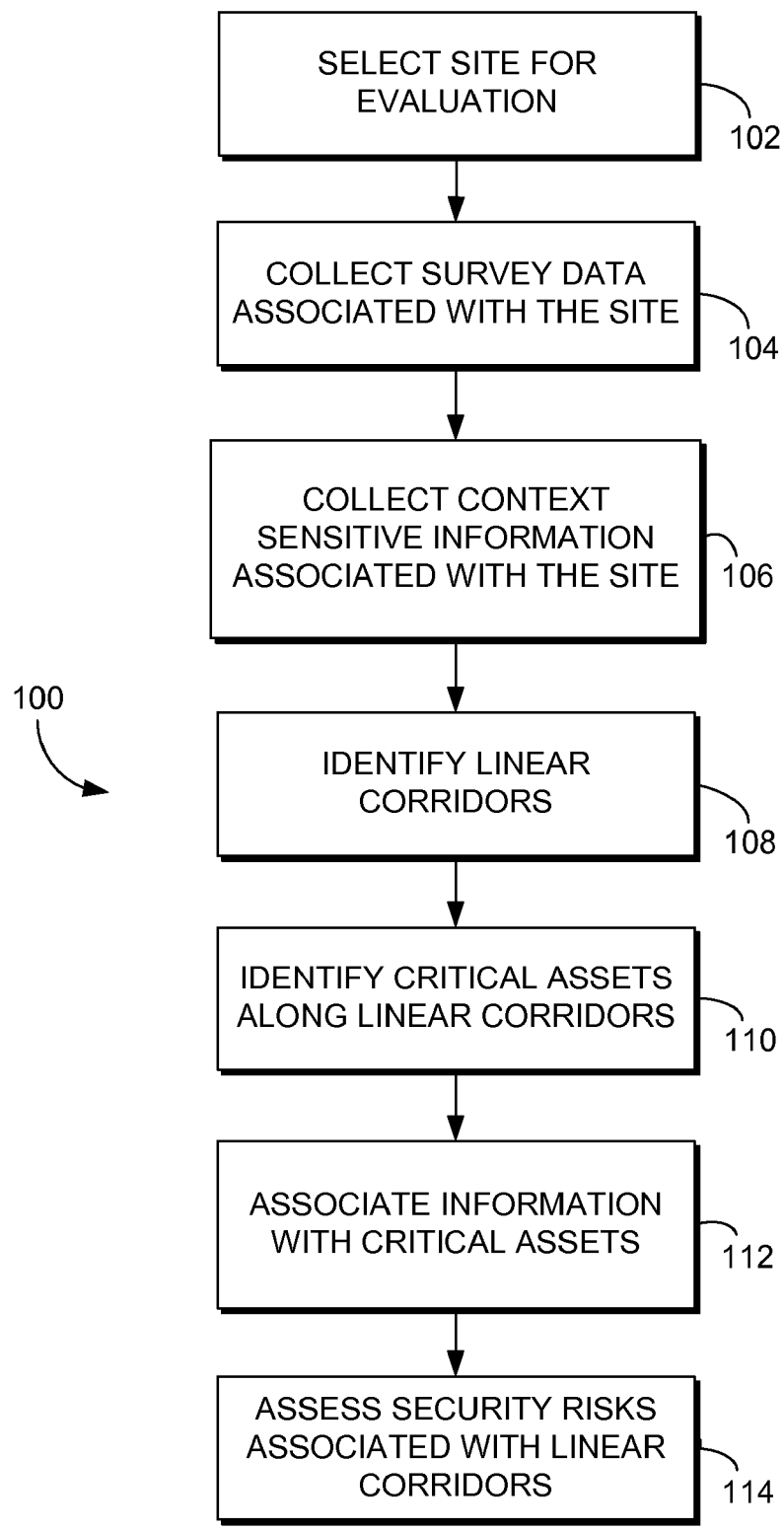
FIG. 1 is a flow diagram showing an exemplary method for assessing security risks associated with linear corridors in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention relate to assessing security risks associated with linear corridors, such as transportation corridors and utility corridors, for example. In accordance with embodiments of the present invention, survey and context sensitive data may be collected for areas surrounding linear corridors. The linear corridors may be identified within the various data, and critical assets may be identified along each linear corridor. Users may access the data (e.g., via a computerized risk assessment system) to asses security risks associated with the critical assets and linear corridors. Mitigation and response strategies may also be developed using the detailed survey and context sensitive data.

Accordingly, embodiments of the present invention provide, among other things, a tool for multifunctional security analysis for linear corridors including risk assessment and planning, mitigation and preparedness, response, and recovery. Embodiments provide detailed geographic, demographic, environmental and other types of information and dedicated tools to facilitate the analysis of security risks associated with linear corridors and the development of mitigation strategies. In addition, embodiments of the present invention facilitate the distribution of information regarding mitigation and response strategies by providing for the communication of such information to emergency response personnel via emergency responder networks, for example.

A variety of benefits may be realized via embodiments of the present invention, including, but not limited to: consistent, organized, and accessible information for security risk evaluation and assessment; cost effective use of skilled resources; factual presentation of information; ability to view linear corridor assets and their adjacent communities; minimal disruption to corridor service; enhanced safety for personnel (by minimizing on-the-ground interaction with linear corridor operations); scaleable to meet multiple security planning purposes and locations; and ability to tie into emergency responder networks, such as the Operation Respond emergency responder network.

Although some embodiments of the present invention are generally described herein in the context of assessing security risks associated with terrorist activity, one skilled in the art will recognize that embodiments of the present invention may further facilitate assessing risks and developing mitigation and event response strategies for other types of events, such as natural disasters and accidents.

Some embodiments of the present invention may be implemented at least in part in a variety of computing system environments. For example, embodiments may be implemented in an application program running on one or more personal computers (PCs). This computing system environment is only one example of a suitable computing environment and is not intended to suggest any limitation as to the scope of use or functionality of the invention. Embodiments of the invention may also be implemented with numerous other general purpose or special purpose computing system environments or configurations. Examples of other well-known computing systems, environments, and/or configurations that may be suitable for use with the invention include, but are not limited to, server computers, hand-held or laptop devices, multiprocessor systems, microprocessor-based systems, programmable consumer electronics, network PCs, minicomputers, mainframe computers, distributed computing environments that include any of the above systems or devices, and the like.

Embodiments of the invention may be described in the general context of computer-executable instructions, such as program modules. Generally, program modules include routines, programs, objects, components, segments, schemas, data structures, etc. that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

Computers typically include a variety of computer-readable media. Computer-readable media includes any media that can be accessed by a computer and includes both volatile and nonvolatile media, removable and non-removable media. By way of example, and not limitation, computer-readable media may comprise computer storage media and communications media. Computer storage media include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD), holographic or other optical storage, magnetic cassettes, magnetic tape, magnetic disk storage or other magnetic storage devices, or any other medium which can be used to store the desired information and which can be accessed by a computer.

Communications media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes wired media such as a wired network or direct wired connection, and wireless media such as acoustic, RF, infrared, spread spectrum and other wireless media. Communications media are commonly used to upload and download information in a network environment, such as the Internet. Combinations of any of the above should also be included within the scope of computer-readable media.

The computer may operate in a networked environment using logical connections to one or more remote computers, such as a personal computer, a server, a router, a network PC, a peer device or other common network node, and typically includes many or all of the elements described above. The logical connections may include connections to a local area network (LAN), a wide area network (WAN) and/or other networks. Such networking environments are commonplace in offices, enterprise-wide computer networks, intranets and the Internet.

Computer storage mechanisms and associated media provide storage of computer-readable instructions, data structures, program modules and other data for the computer. A user may enter commands and information into the computer through input devices such as a keyboard and pointing device, commonly referred to as a mouse, trackball or touch pad. Other input devices may include a microphone, touchscreen, camera, joystick, game pad, scanner, or the like. In addition to a monitor or other type of display device, computers may also include other peripheral output devices such as speakers and printers, which may be connected through an output peripheral interface.

Although many other internal components of computers have not been discussed herein, those of ordinary skill in the art will appreciate that such components and their interconnection are well-known. Accordingly, additional details concerning the internal construction of computers need not be disclosed in connection with the present invention.

Turning now to FIG. 1, a flow diagram is provided illustrating an exemplary method 100 for assessing security risks associated with linear corridors in accordance with an embodiment of the present invention. Initially, as shown at block 102, a site is selected for evaluation. Generally, the site may comprise an area of any size. By way of example only and not limitation, in some embodiments, the site may be a municipality, such as a city, which may include a number of linear corridors. In some embodiments, the site may comprise a single linear corridor or simply a portion of a single linear corridor. Any and all such variations are contemplated to be within the scope of the present invention.

As shown at block 104, survey data regarding the site is collected by surveying the site. In some embodiments of the present invention, collection of survey data may also include obtaining video and still images of portions of the site. Any of a variety of survey methods may be employed within the scope of the present invention. However, in some embodiments, non-intrusive and/or non-contact survey methods may be employed. The collection of data in such a manner allows a significant amount of survey data to be collected in an accurate, safe, and rapid manner, while not disrupting operations of linear corridors. For example, three dimensional survey data may be collected from an aircraft using light detection and ranging (LiDAR) technology. Additionally, an aircraft may be equipped with front- and downward-facing video and still cameras to obtain video and still images of portions of the site. A variety of other non-intrusive technologies, such as ground penetrating radar (GPR), Sonar, and remote sensing applications, may also be employed within the scope of the present invention.

Context sensitive information regarding the site is also collected, as shown at block 106. The information collected may include demographic, transportation, environmental, and linear corridor information, as well as a variety of other types of context sensitive information. Such information may be collected from any of a variety of different sources within the scope of the present invention. For example, such information may be collected from existing public and commercially available GIS data resources. In some embodiments, the information may include real-time data, such as current weather information, which may assist in assessing not only security risks but also identifying mitigation and response strategies for actual events. For example, real-time wind speed and direction information may be useful in determining the areas that may be impacted by a release of TIH chemicals.

As shown at block 108, linear corridors are identified within the survey data and the context sensitive information collected at blocks 104 and 106. As discussed previously, such linear corridors may include, for example, transportation corridors, such as roadway, rail, and waterway corridors. Additionally, such linear corridors may include utility corridors, such as water, electric, and gas corridors, for example.

Critical assets along each linear corridor are also identified, as shown at block 110. Generally, an asset may be any element or feature of a linear corridor. For example, with respect to a rail corridor, assets may include such elements as bridges, grade crossings, mainline turnouts, mainline diamonds, mainline signals, track segments, and yard sites. Each corridor may include a wide variety of different assets. However, many of the assets may be irrelevant for risk assessment purposes. For example, assets associated with a linear corridor may include such features as buildings, curb lines, and fences that are common and alone would be little use to a terrorist in causing a large scale incident. Accordingly, the assets that are most likely to be used in terrorist activities and are most relevant for risk assessment purposes are identified as critical assets.

Survey and context sensitive data are next associated with each identified critical asset and attributes are defined for each critical asset, as shown at block 112. By associating the data and defining asset attributes, the context for effective risk assessment and decision-making may be provided. A wide variety of data and attributes may be associated with each critical asset. By way of example only and not limitation, Table 1 below presents exemplary data elements and asset attributes that may be associated with a variety of rail assets. It should be noted that the assets and associated data and attributes shown in Table 1 are provided for illustrative purposes only and should in no way be considered limiting. A variety of additional assets may be considered critical assets for rail corridors. In addition, a variety of additional data and attributes may be associated with each critical asset listed in Table 1.

TABLE 1

Exemplary Data and Attributes for Rail Assets

| Asset | Asset Data and Attributes |
|---|---|
| Railroad Bridge | Bridge identification, railroad owner, subdivision, milepost, material, type of construction, type of foundation, span lengths and number of spans, crossing feature type, crossing feature name, crossing feature owner, roadway ADT, number of freight trains per day, number of passenger trains per day, use by hazardous material cars, track speed, track class, population within a half-mile radius, predominant land use within a half-mile radius, county, township |
| Roadway Bridge | Bridge identification, railroad owner, subdivision, milepost, material, type of construction, type of foundation, span lengths and number of spans, crossing feature type, crossing feature name, crossing feature owner, roadway ADT, number of freight trains per day, number of passenger trains per day, use by hazardous material cars, track speed, track class, population within a half-mile radius, predominant land use within a half-mile radius, county, township |
| Grade Crossing | FRA crossing identification, railroad owner, crossing warning system type, number of tracks, crossing roadway name, crossing roadway owner, number of roadway lanes, roadway ADT, type of crossing surface construction, number of freight trains per day, number of passenger trains per day, use by hazardous material cars, track speed, track class, population within a half-mile radius, predominant land user within a half-mile radius, county, township |
| Mainline Turnout | Interlocking identification, railroad owner, subdivision, milepost, turnout frog number, number of freight trains per day, number of passenger trains per day, use by hazardous material cars, track speed, track class, population within a half-mile radius, predominant land use within a half-mile radius, county, township |
| Diamond Crossing | Interlocking identification, railroad owner, subdivision, milepost, turnout frog number, number of freight trains per day, number of passenger trains per day, use by hazardous material cars, track speed, track class, population within a half-mile radius, predominant land use within a half-mile radius, county, township |
| Signal | Interlocking identification, aspects, type of signal, type of control, railroad owner, subdivision, milepost, number of freight trains per day, number of passenger trains per day, use by hazardous material cars, track speed, track class, population within a half-mile radius, predominant land use within a half-mile radius, county, township |

Having collected detailed survey and context sensitive information and associated the information with critical assets, security risks associated with the linear corridors within the site may be assessed, as shown at block 114. Generally, a system (such as that described in further detail below) may be provided to allow users to access the detailed survey and context sensitive information and assess security risks associated with linear corridors. The system may provide a number of user interfaces (such as those also described in further detail below) for accessing the data and assessing security risks. The user interfaces may include context sensitive mapping allowing users to view linear corridors and critical assets in the context of the survey data and context sensitive information collected for the site.

In various embodiments of the present invention, security risks may be evaluated and assessed at a variety of different levels. For example, in some embodiments, security risks may be assessed for each critical asset. Additionally or alternatively, in some embodiments, security risks for a portion of a linear corridor or an entire linear corridor may be assessed. In some cases, this may comprise assessing risk at each point along the linear corridor. In other cases, this may entail aggregating security risks associated with the critical assets within the portion of the linear corridor under review. In further embodiments of the present invention, security risks may be accessed for a selected area having multiple linear corridors within the site.

The assessment of security risks associated with linear corridors may employ a subjective and/or objective approach within various embodiments of the present invention. Under a subjective approach to risk assessment, a user may access the detailed survey and context sensitive information, viewing linear corridors and critical assets in the context of such information. After reviewing the information, the user may make a subjective determination of security risks associated with linear corridors and critical assets. As will be discussed in further detail below, a system may be provided allowing the user to enter and record such subjective determinations.

In some embodiments, an objective approach to risk assessment may be employed. For example, risk assessment metrics may be defined within the system to allow for the objective quantification of risk associated with linear corridors under review based on the detailed survey and context sensitive information. The risk assessment metrics may consist of relative values assigned for different aspects and parameters associated with security risk. For instance, different values may be assigned based on the population density within a particular radius around a critical asset. As another example, values may be assigned based on the accessibility of a critical asset (e.g., whether the area is fenced, has security cameras, etc.). As a further example, values may be assigned based on aspects of a critical asset, such as the structural integrity of a bridge, for example. Accordingly, risk assessment metrics may be defined for a wide variety of parameters within the scope of the present invention, thereby allowing for an objective quantification of security risk associated with critical assets and linear corridors.

It should be noted that the assessment of security risks within block 114 may include various activities within the scope of the present invention and is not necessarily limited to merely risk assessment. For example, the activities may include development of mitigation strategies, planning and preparedness, response strategies, and recovery strategies. For instance, by evaluating detailed survey data and context sensitive information associated with a particular critical asset, a user may determine that particular infrastructure improvements would be appropriate. As another example, the assessment of risks associated with linear corridors may facilitate the routing of hazardous materials to reduce the use of corridors identified as having the highest risk, thereby reducing the threat of a devastating terrorist attack.

Figure 2:
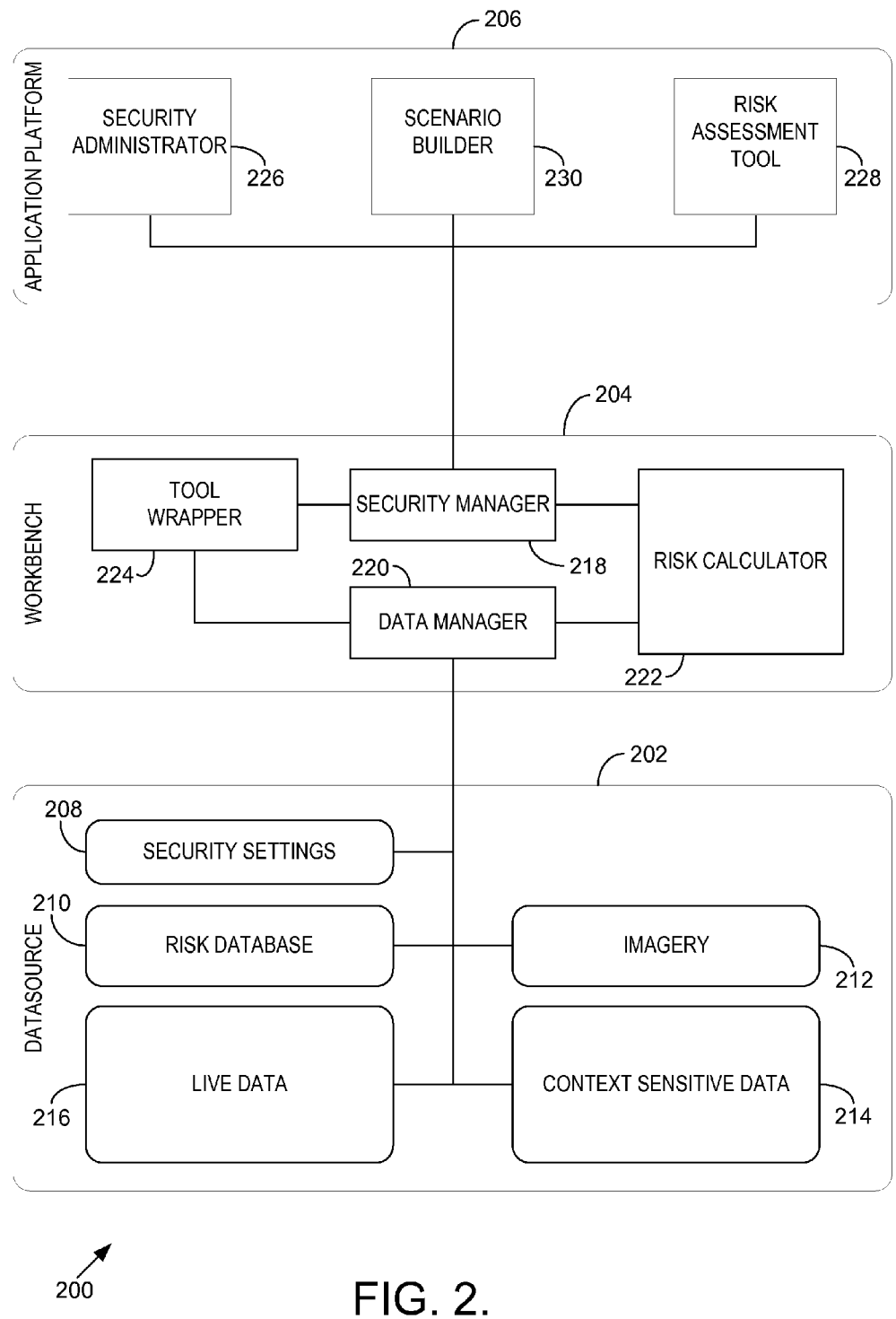
FIG. 2 is a block diagram showing an exemplary system that may be employed for assessing security risks associated with linear corridors in accordance with an embodiment of the present invention.

With reference to FIG. 2, a block diagram is provided illustrating an exemplary risk assessment system 200 that may be employed for assessing security risks associated with linear corridors in accordance with an embodiment of the present invention. The risk assessment system may be centrally located and accessible to multiple users using customized user interfaces and security logins. Accordingly, the risk assessment system may provide for the distribution of consistent data to multiple users while allowing for custom dedicated tools by user needs. As shown in FIG. 2, the risk assessment system 200 may generally comprise a datasource 202, a workbench 204, and an application platform 206. It should be understood that the risk assessment system 200 shown in FIG. 2 is provided for illustrative purposes only and is not intended to limit the scope of the present invention.

The datasource 202 is configured to store the various pieces of data used by the risk assessment system 200 and may comprise a number of data components. For example, the datasource 202 may include a security settings component 206, which includes user information, such as usernames and passwords that may be associated with user profiles. The user profiles define each user's access to the system and the various data pieces. In addition, the user profiles may define each user's ability to enter and modify data. The datasource 202 may also include a risk database 210, which stores data associated with the determination of security risks for linear corridors. For example, the risk database 210 may store values used as inputs in the objective calculation of security risks associated with linear corridors. In turn, risk values that are determined by an objective risk calculation may also be stored in the risk database 210. The risk database 210 may further store subjective comments and other information entered by users.

The datasource 202 may also include an imagery component 212 for storing imagery data. Such data may include any digital imagery gathered for the area being evaluated. For example, the data may include base maps, aerial photos, videos, and still images that have been collected. The datasource 202 may further include a context sensitive data component 214, which may store any type of context sensitive information that has been collected for the area being evaluated, such as demographic information, environmental information, corridor asset information, and the like. The context sensitive data may include, for example, information gathered from GIS databases. The datasource 202 may further include a live data component 216, which may be configured to store or provide access to real-time data 216, such as current weather conditions, for example.

The workbench 204 operates as the center of processing for the risk assessment system and may include a number of components, such as a security manager 218, a data manager 220, a risk calculator 222, and a tool wrapper 224. The security manager 218 coordinates user access to the system based on user information stored in the security settings component 208 of the datasource 202. In addition, the security manager 218 allows administrators to define and modify those security settings. The workbench also includes a data manager 220, which operates to push and pull data to and from the datasource 202. The data manager 220 may communicate with other components of the workbench and application platform to coordinate access to appropriate data pieces stored by the datasource 202, as well as receiving data from these other components and communicating the data to the datasource 202 for storage.

In embodiments in which objective risk assessment may be performed, the workbench may also include a risk calculator 222 for performing objective risk assessment calculations. The data manager 220 and risk calculator 222 may communicate to access the appropriate data pieces for the calculation of risk values for linear corridors. Further, in some embodiments, a tool wrapper component 224 may be provided to allow for the addition of third party modules that would be interfaced with the workbench 204, thereby providing additional risk assessment features. Third party modules may handle data pieces differently than the risk assessment system 200. Accordingly, the tool wrapper component 224 may provide for the transformation of data between formats appropriate for the risk assessment system 200 and a third party module interfaced with the system.

The risk assessment system 200 further includes an application platform 206, which facilitates user interaction with the risk assessment system 200 via a variety of user interfaces. For example, the application platform 206 may include a security administrator component 226, which provides for user access to the system via a secure login process. In addition, the security administrator 226 provides user interfaces allowing administrators to manage the security settings for various users. The application platform 206 also includes a risk assessment tool 228, which provides for the primary user interaction with risk assessment information stored by the datasource 202. The risk assessment tool 228 may provide various user interfaces allowing users to view various aspects of linear corridors under review, including geospatial data, context sensitive information, video imaging, and the like. In addition, the risk assessment tool 228 facilitates the subjective and/or objective assessment of security risks associated with linear corridors. The application platform 206 may further include a scenario builder 230, which may allow users to generate hypothetical threat scenarios and determine risks associated with those scenarios. A variety of additional tools not shown in FIG. 2 may be further provided via the application platform 206 within the scope of the present invention.

As indicated previously, embodiments of the present invention provide user interfaces for navigating the detailed information associated with linear corridors and assessing security risks associated with each corridor. Referring first to FIGS. 3A through FIG. 3I, a series of screen displays are provided illustrating user interfaces for navigating linear corridors and assessing security risks associated with those corridors in accordance with an embodiment of the present invention. It will be understood and appreciated by those of ordinary skill in the art that the screen displays of FIGS. 3A through 3I are provided by way of example only and are not intended to limit the scope of the present invention in any way.

Figure 3A:
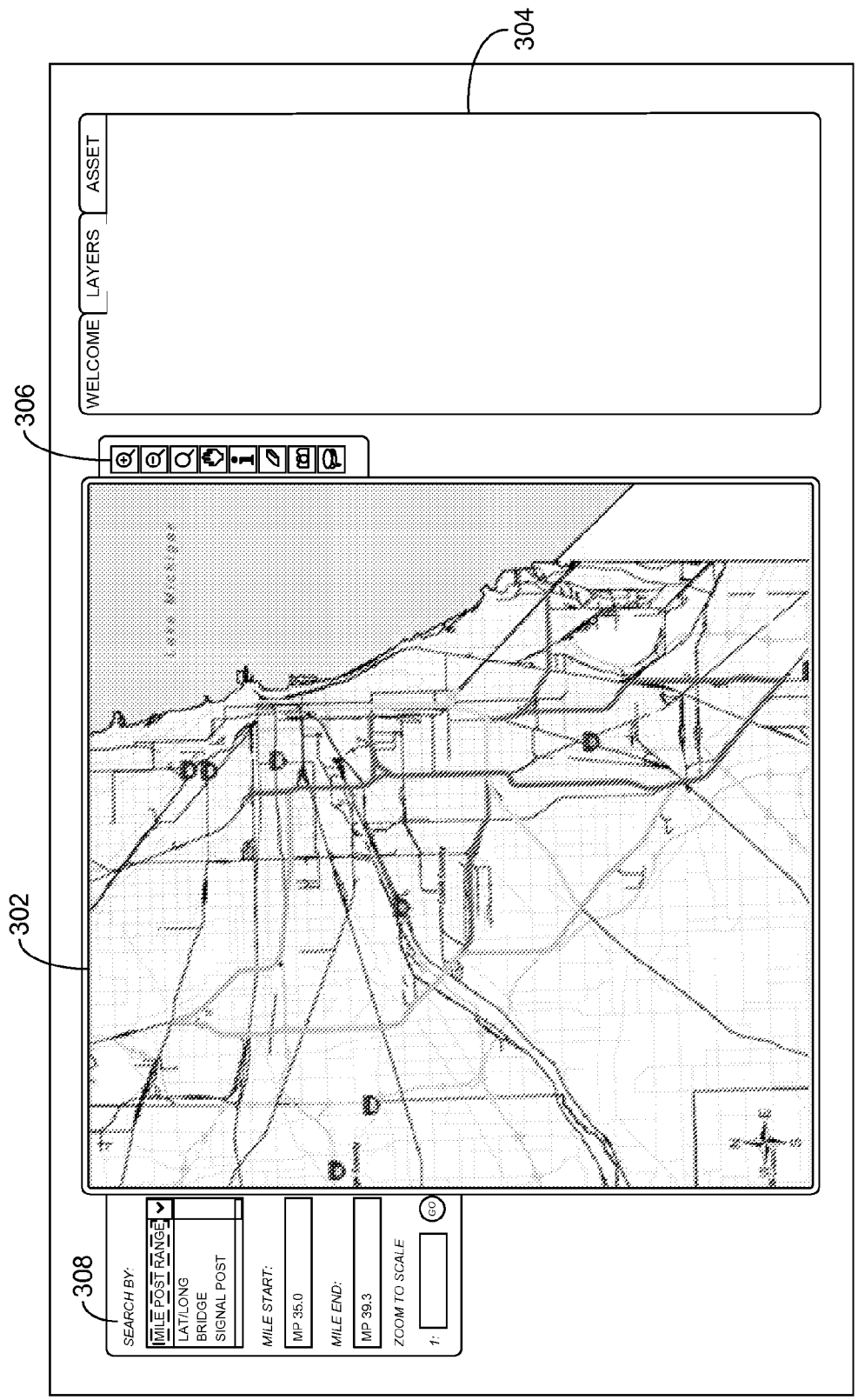
FIGS. 3A-3I are illustrative screen displays showing user interfaces for navigating linear corridors and assessing security risks associated with the linear corridors in accordance with an embodiment of the present invention.

Initially, a user may access the system and view a general area of interest. For example, as shown in FIG. 3A, a user has accessed the system and is viewing a map of Chicago. Typically, accessing the system will comprise a secure login process, such as a user being required to provide a valid username and password. As shown in FIG. 3A, the user interface includes a navigation window 302 for viewing and navigating the area under review. The navigation window provides a variety of geospatial data for an area navigated to by a user. The user interface further includes an attributes area 304, allowing a user to further access a variety of information associated with the area under review, as well as input data into the system.

A variety of search methods may be used for navigating linear corridors within the scope of the present invention. By way of example only and not limitation, such search methods may include map driven searches, corridor and milepost searches, street address searches, and latitude/longitude coordinate searches. For example, in some embodiments, a search may be map driven by a user interacting with the navigation window 302. A tool bar 306 is located adjacent the navigation window 302 and provides a number of tools for navigating to particular portions of the area under review. For instance, a user may employ tools to zoom in and out of the area. In some cases, a user may graphically select a particular corridor. The user interface also includes a search tool 308, allowing a user to enter search criteria for quickly navigating to a particular area of interest.

Figure 3B:
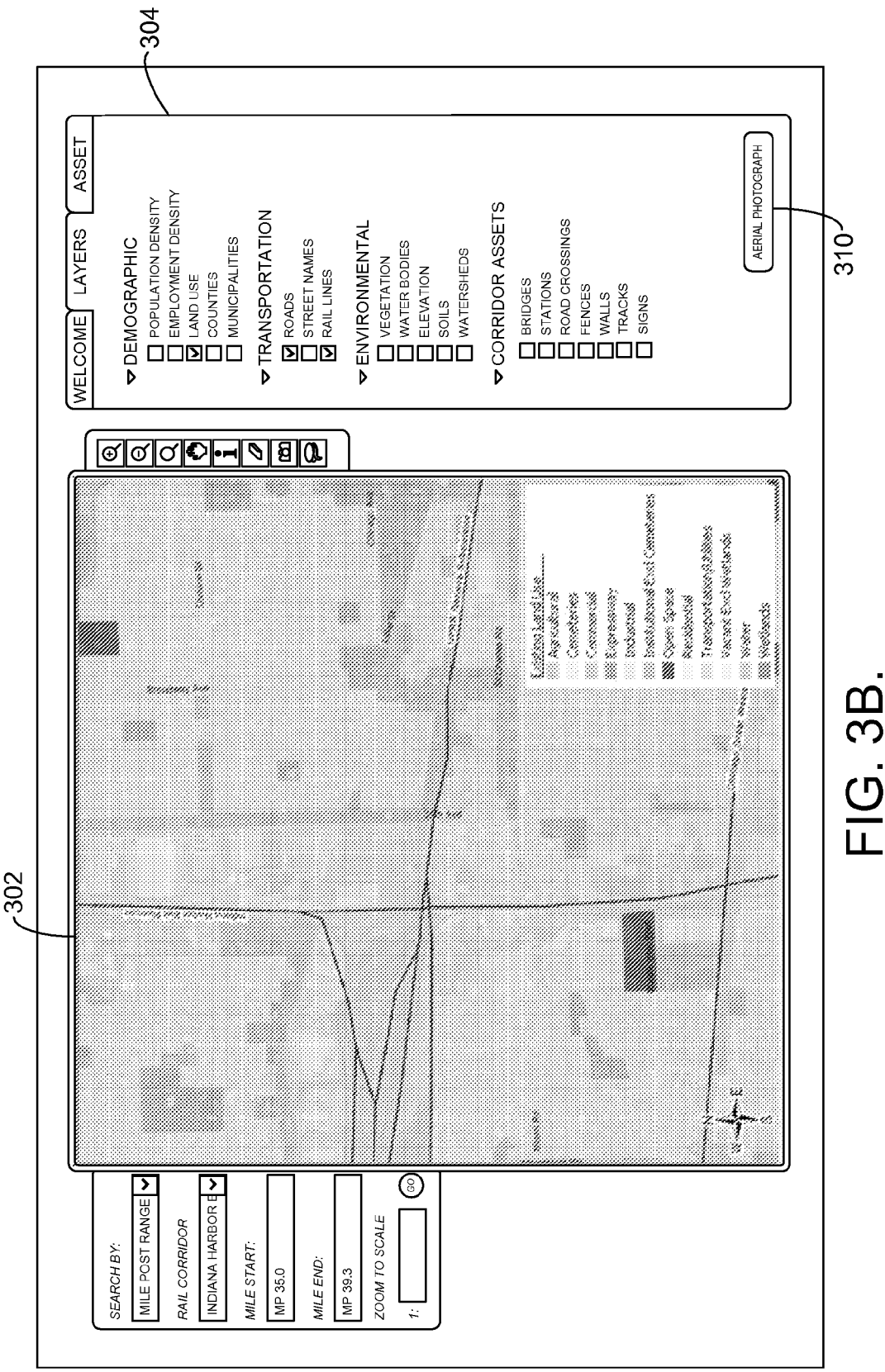

As shown in FIG. 3B, as a user zooms into a particular area of interest, a variety of contextual information may be viewed in the navigation window 302. A "Layers" tab is provided in the attributes area 304, allowing a user to control the contextual information that is presented in the navigation window 302. By employing the "Layers" tab, a user may select the particular layers of contextual information that the user wishes to view. A wide variety of layers of contextual information may be selectively turned on and off. Such information may include, for example, demographic information, transportation information, environmental information, and corridor asset information. By selectively viewing particular layers, a user may view appropriate contextual information in conjunction with linear corridors. For example, in some cases, a user may be primarily interested in population density along a particular corridor and may select to view only that layer while removing other layers. In other cases, a user may be primarily interested in environmental considerations associated with a corridor and may view that layer while removing other layers. In some embodiments, system-defined and/or user-defined shortcuts may be provided to quickly activate appropriate data layers and map scales.

Figure 3C:
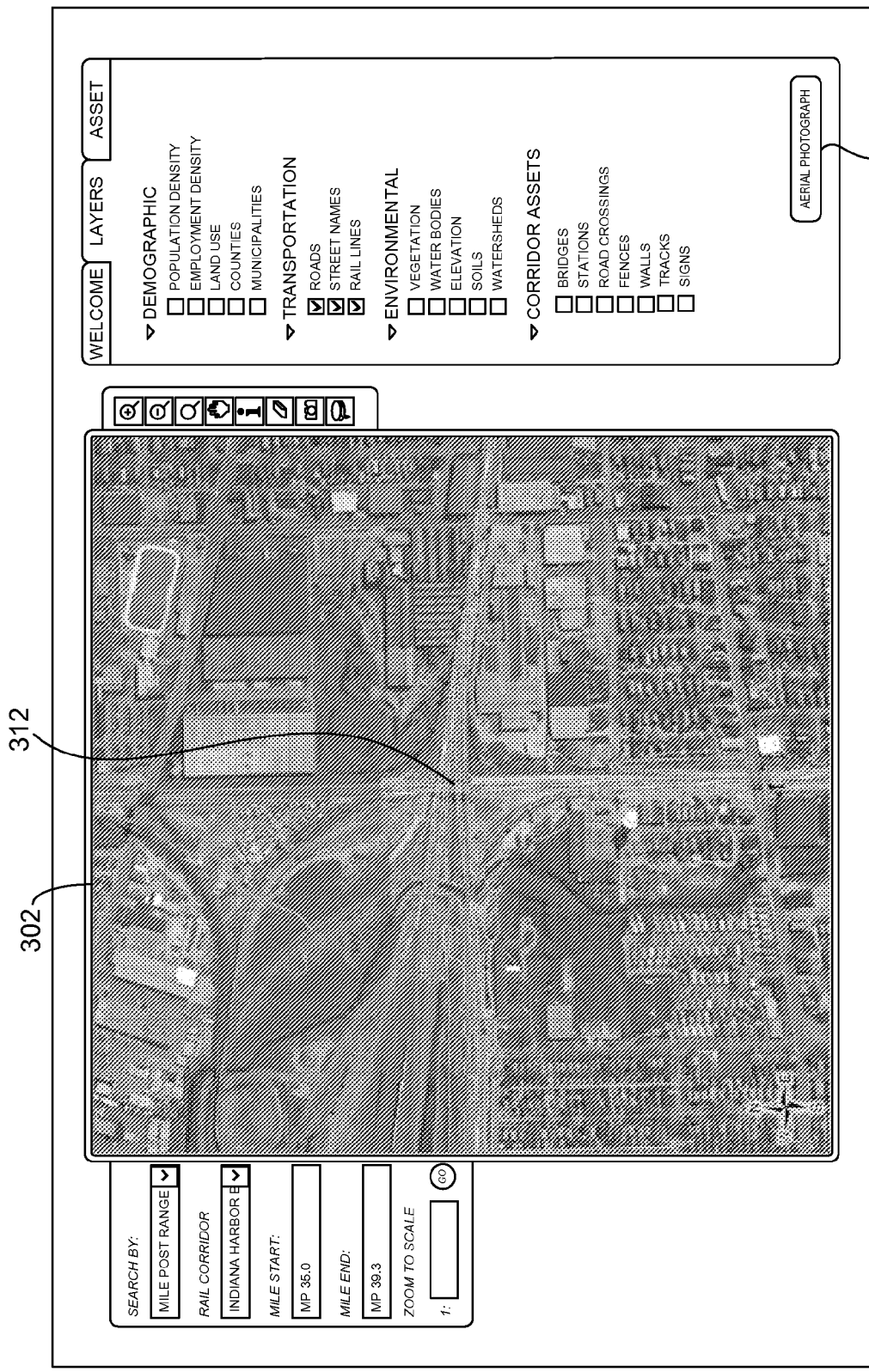
Figure 3D:
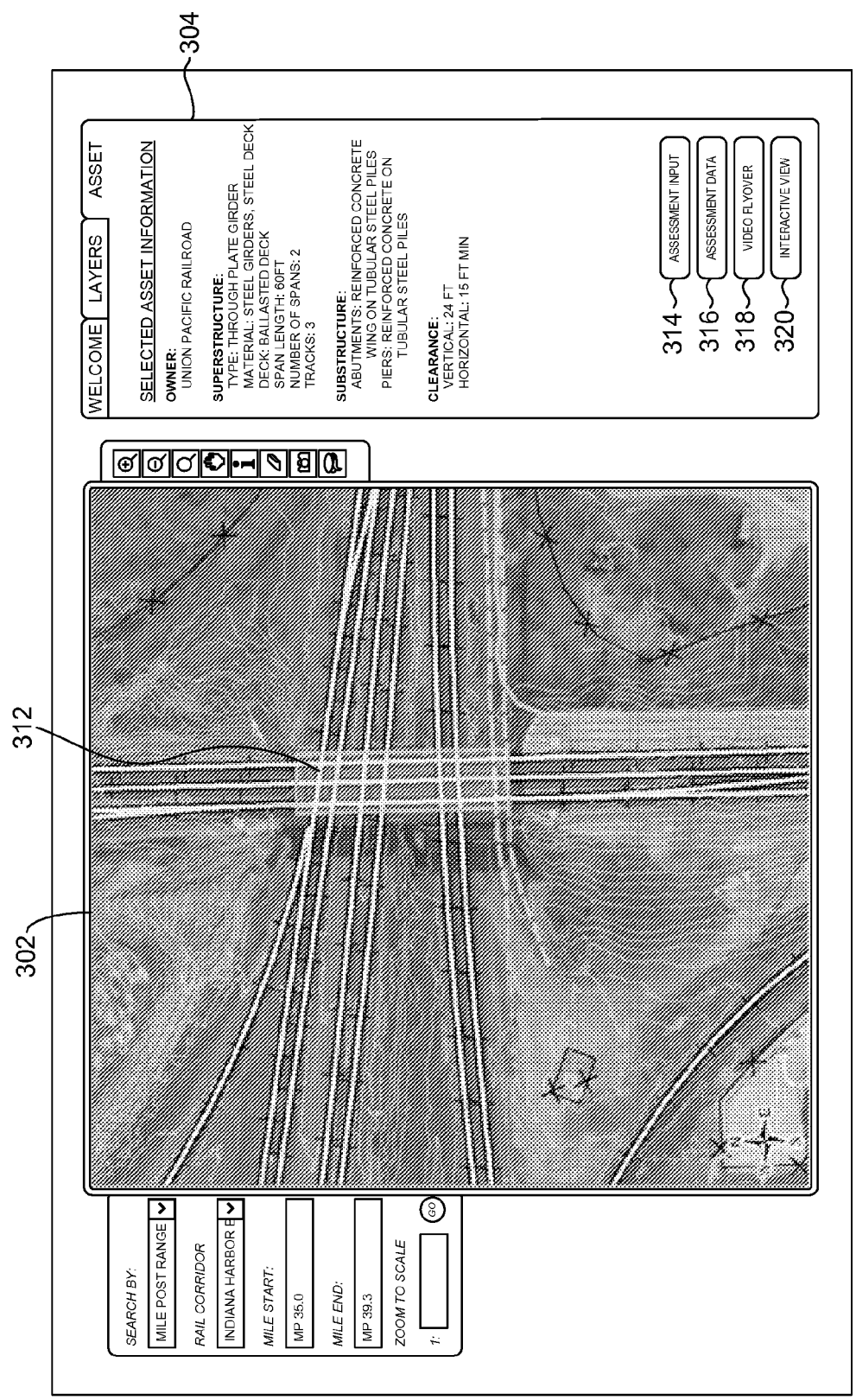

An aerial photograph button 310 is also provided within the layers tab 308. By selecting the aerial photograph button 310, an aerial photograph may be overlaid onto the navigation window 302, as shown in FIG. 3C. Accordingly, a user may view additional contextual information via the aerial photograph.

As a user navigates through an area, the user may recognize and wish to evaluate critical assets associated with linear corridors. For example, a user may recognize the bridge 312 in the navigation window 302 of FIG. 3C as a critical asset and may select the bridge 312 for further evaluation. After selecting the bridge 312, detailed information regarding the critical asset may be viewed, as initially shown in FIG. 3D. Details of the critical asset are shown in the navigation window 302, allowing the user to consider such issues as drainage, accessibility, general topography, and other features. In addition, an "Asset" tab of the attributes area 304 provides overview information regarding the selected critical asset, including information such as bridge number, milepost location, structure type, and other related asset information.

Figure 3E:
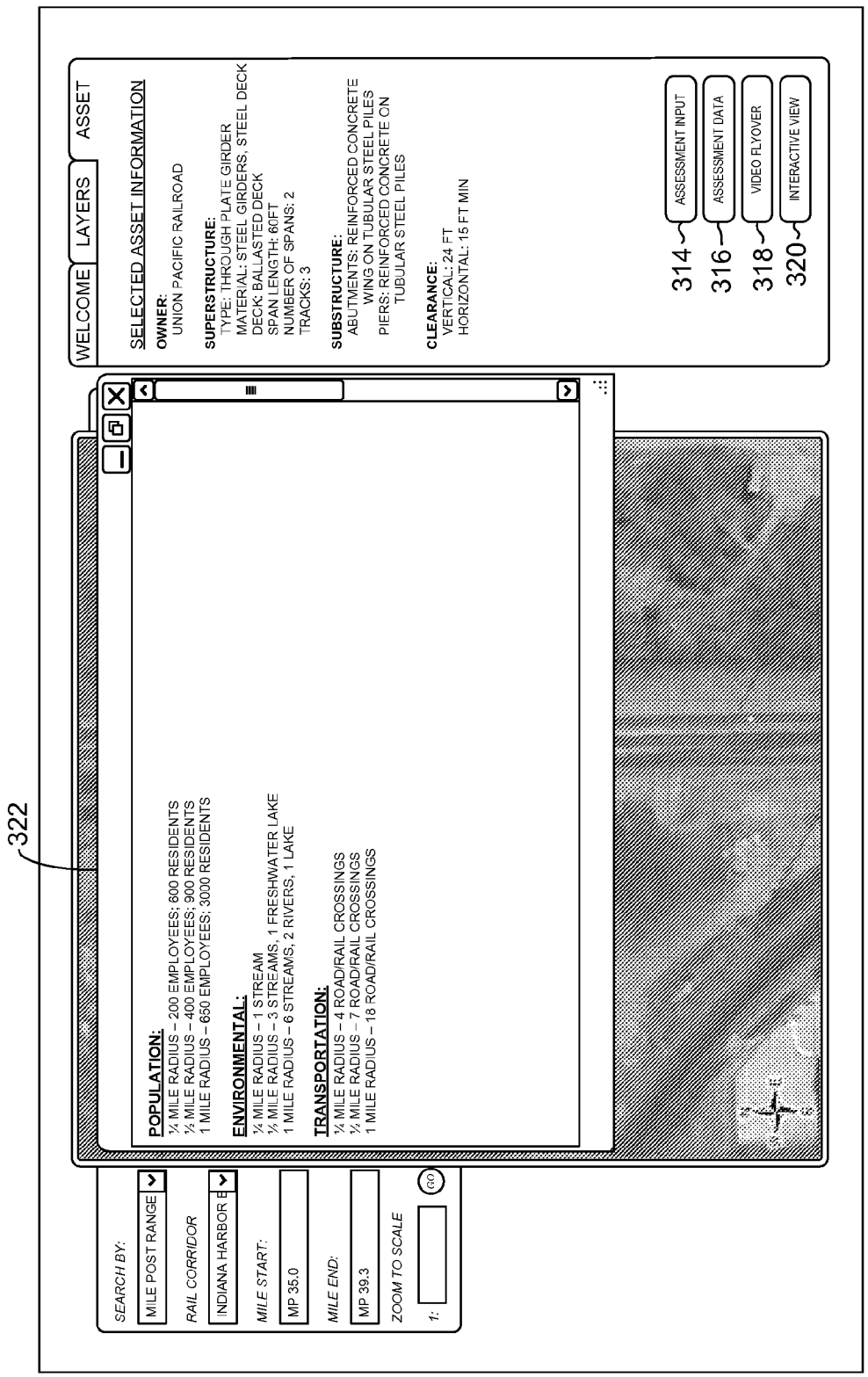
Figure 3F:
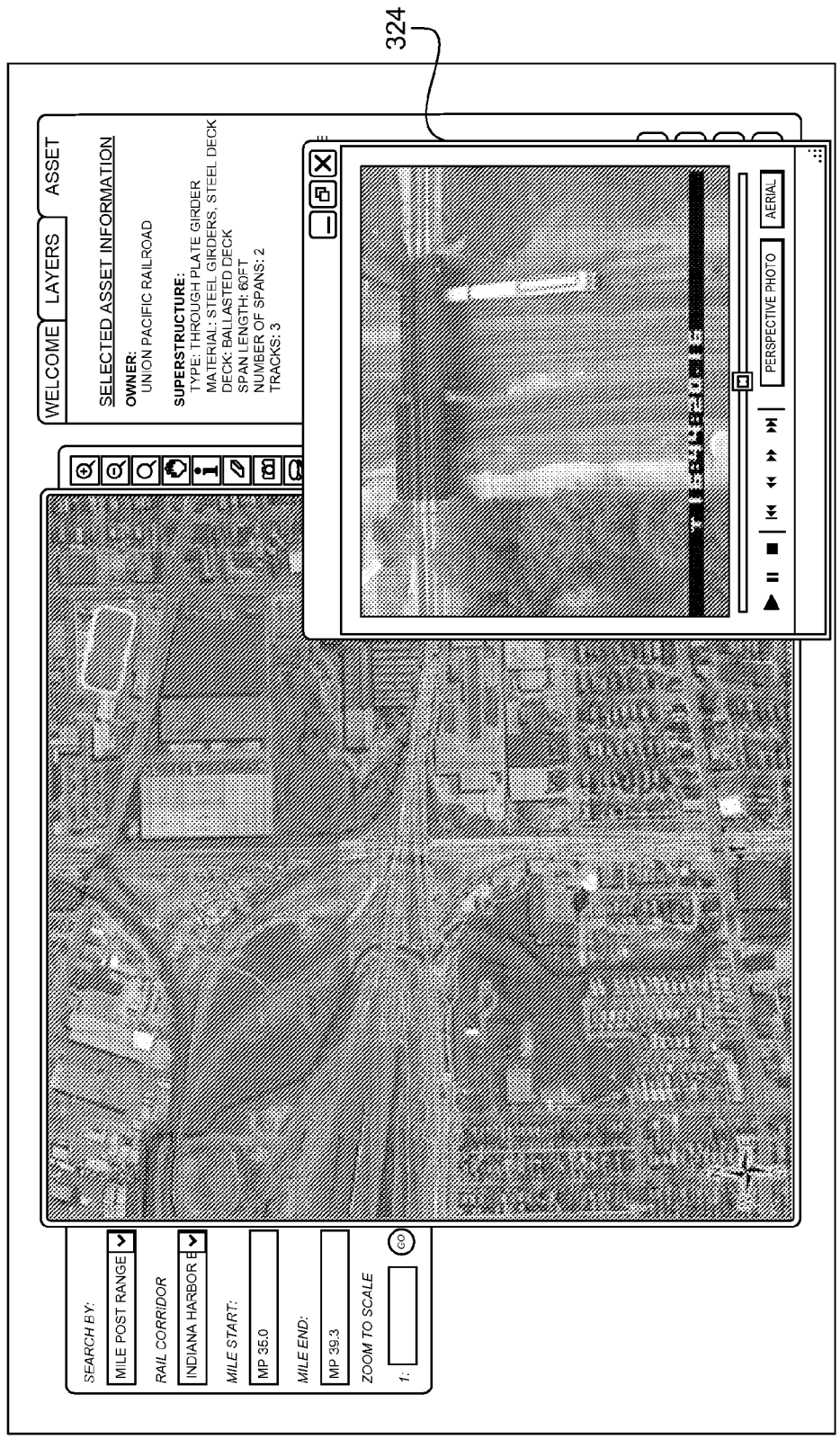
Figure 3G:
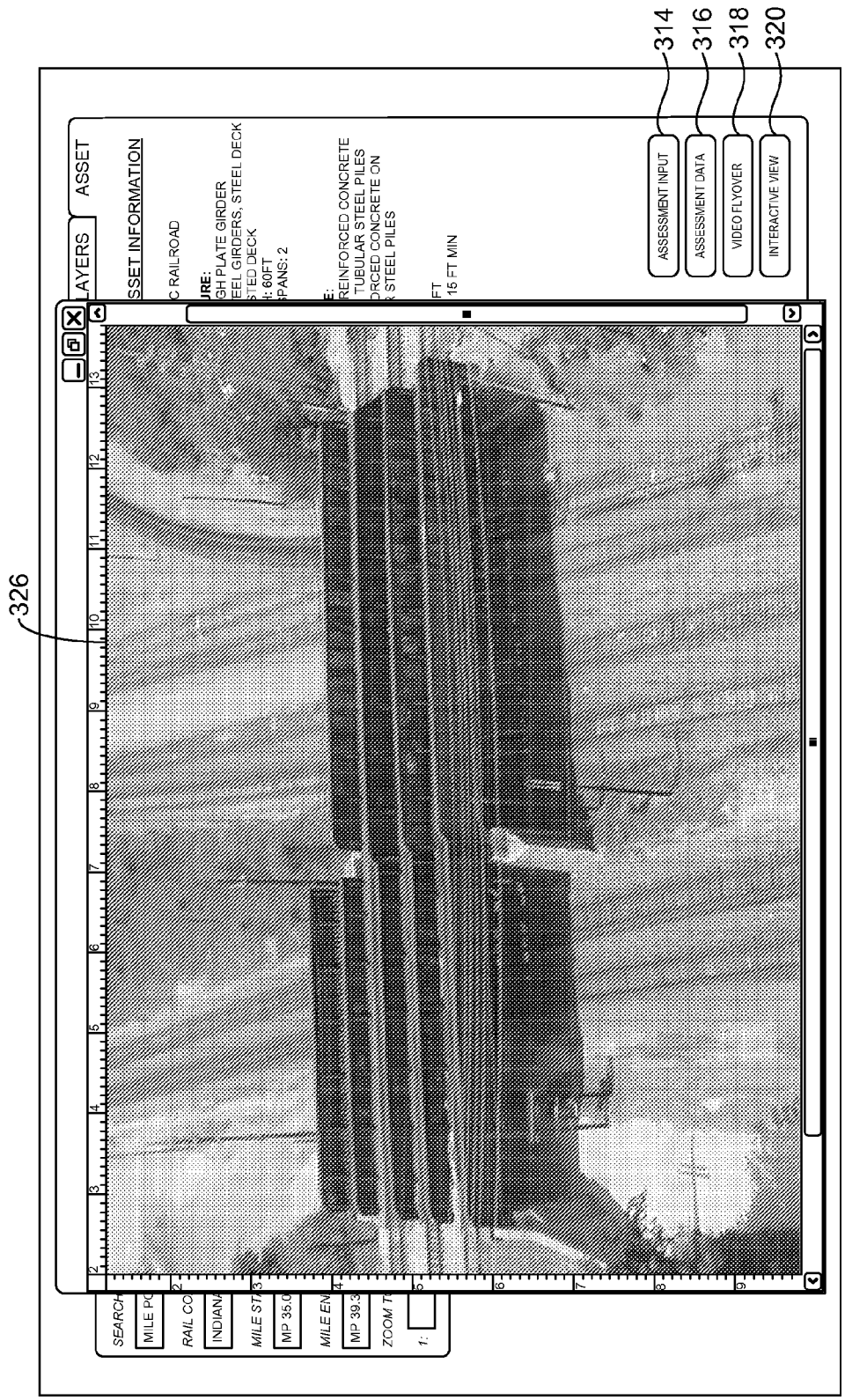

The "Asset" tab further includes a number of buttons 314, 316, 318, and 320, allowing a user to access further information regarding the critical asset. For example, by selecting the assessment data button 316, the user may view additional data associated with the critical asset for the purposes of risk assessment. As shown in FIG. 3E, a data window 322 is presented providing assessment data. The assessment data may include population data, such as a report of resident and employee populations within a quarter-mile, half-mile, and one-mile radius around the asset. The assessment data may also include environmental data, such as water features within a quarter-mile, half-mile, and one-mile radius around the asset. The assessment data may further include transportation data, such as the number and identity of road/rail crossings within a quarter-mile, half-mile, and one-mile radius around the asset.

A user may also wish to view video and still images associated with the critical asset to observe details of the asset for evaluation purposes. Accordingly, by selecting the video fly-over button 318, a user may view video associated with the critical asset, as shown in the video window 324 in FIG. 3F. Additionally, the user may view different resolution still images in an image window 326, such as that shown in FIG. 3G. The images may include both forward-looking and downward-looking still images.

Figure 3H:
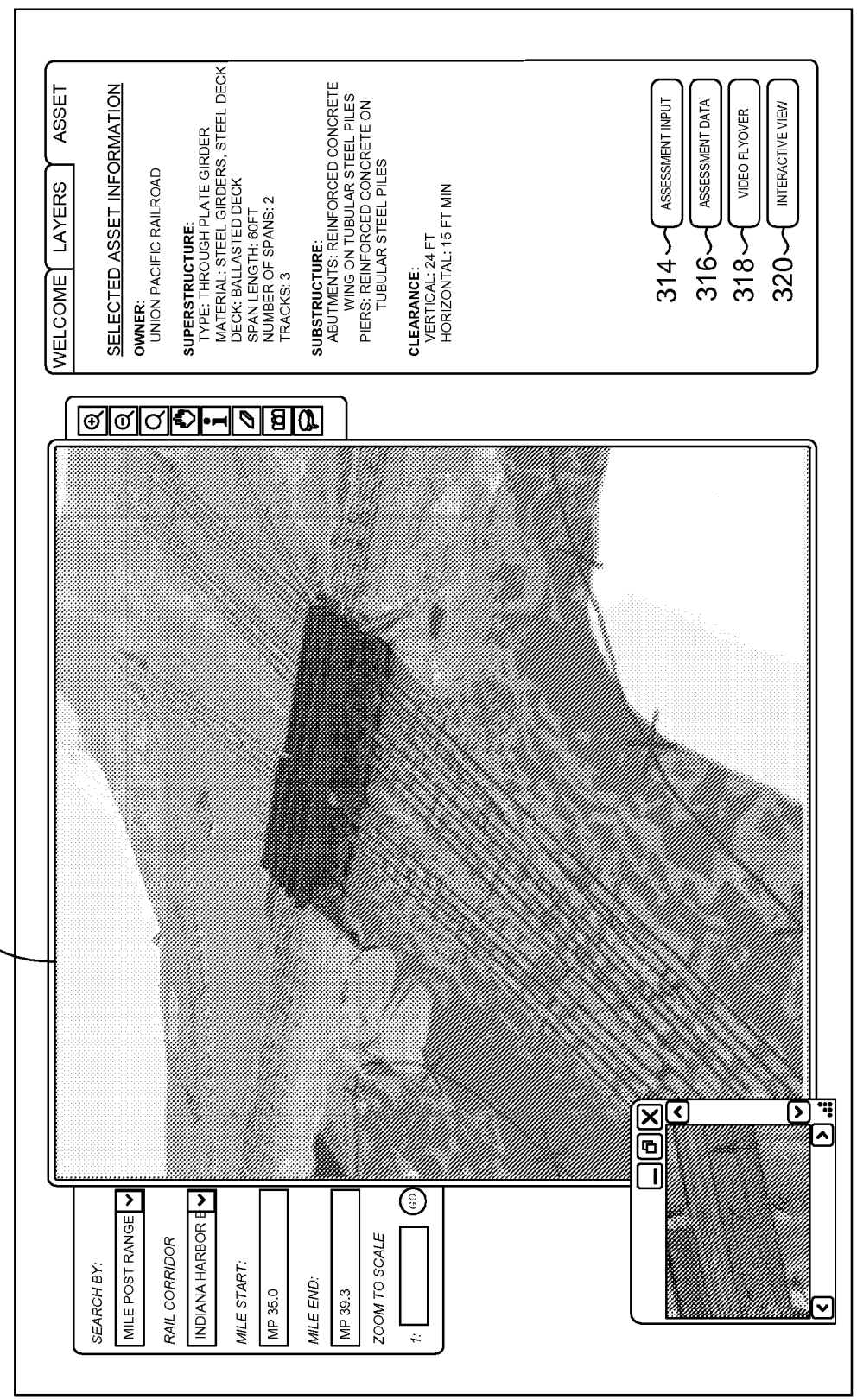

A user may further examine an interactive view by selecting the interactive view button 320. As shown in FIG. 3H, by selecting the interactive view button 320, a user may access a three-dimensional visualization of the critical asset, which is provided in the navigation window 302. The three-dimensional visualization allows the user to view features of the critical asset and surrounding area from different perspectives, further facilitating the risk assessment process.

Figure 3I:
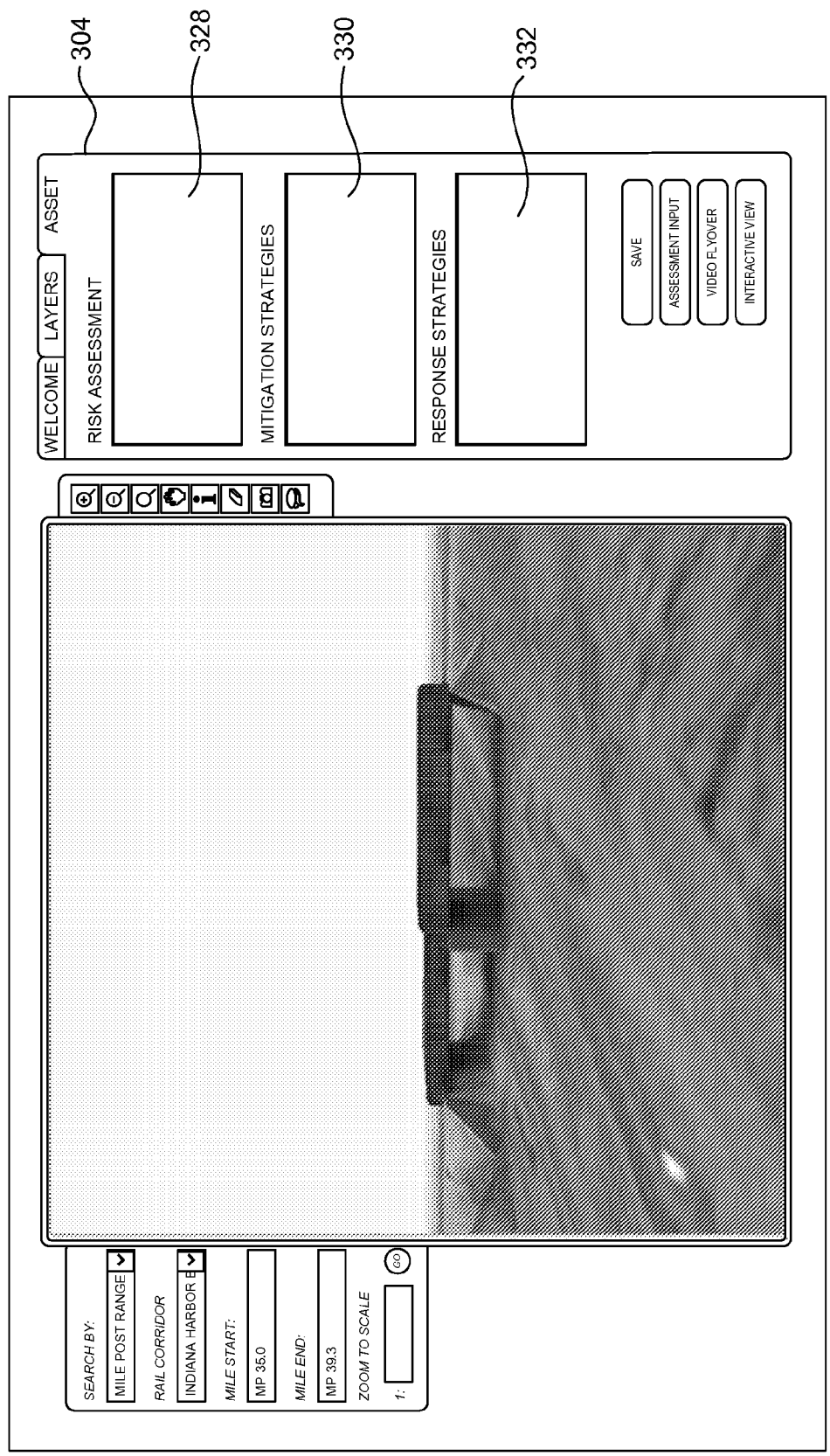

Having reviewed various details and information associated with the critical asset, a user may develop and record assessment information, mitigation strategies, and response strategies by selecting the assessment input button 314. As shown in FIG. 3I, input areas 328, 330, and 332 are provided in the attributes area 304, thereby allowing a user to enter and save details of his/her assessment of the critical asset. Accordingly, the present embodiment illustrates a subjective approach to risk assessment. For example, the user may note potential risks related to the surrounding area, such as risks to nearby residential populations. In addition, users can develop mitigation strategies, such as approaches to harden the critical asset or reduce the accessibility of the asset, making it less susceptible to a terrorist attack. The detailed data, maps, and views of the critical asset provide necessary information upon which to define mitigation elements and strategies.

In some cases, the current user or another user may have previously entered comments regarding the asset. In some embodiments, the user may be able to view and modify the previous entered comments via the input areas 328, 330, and 332. Additionally, selected assessment data may be linked to emergency response networks, such as Operation Respond, to allow for the effective communication of assessment data, mitigation strategies, and response strategies to first response personnel, freight/commuter train operators, freight truck operators, and the like. Accordingly, the response planning process may employ the system to minimize danger to adjacent populations through rapid response. For example, simple train born location equipment employing a GPS receiver and radio frequency transmitter can identify the location and identity of a train that may have been the subject of an attack. A response coordinator or dispatch office may then access detailed information provided via embodiments of the present invention, including detailed maps, photos, and pre-established contingency plans and response strategies to implement appropriate emergency measures.

Referring now to FIG. 4A through FIG. 4I, a series of screen displays are provided illustrating user interfaces for assessing security risks associated with linear corridors in accordance with another embodiment of the present invention. It will be understood and appreciated by those of ordinary skill in the art that the screen displays of FIGS. 4A through 4I are provided by way of example only and are not intended to limit the scope of the present invention in any way.

Figure 4A:
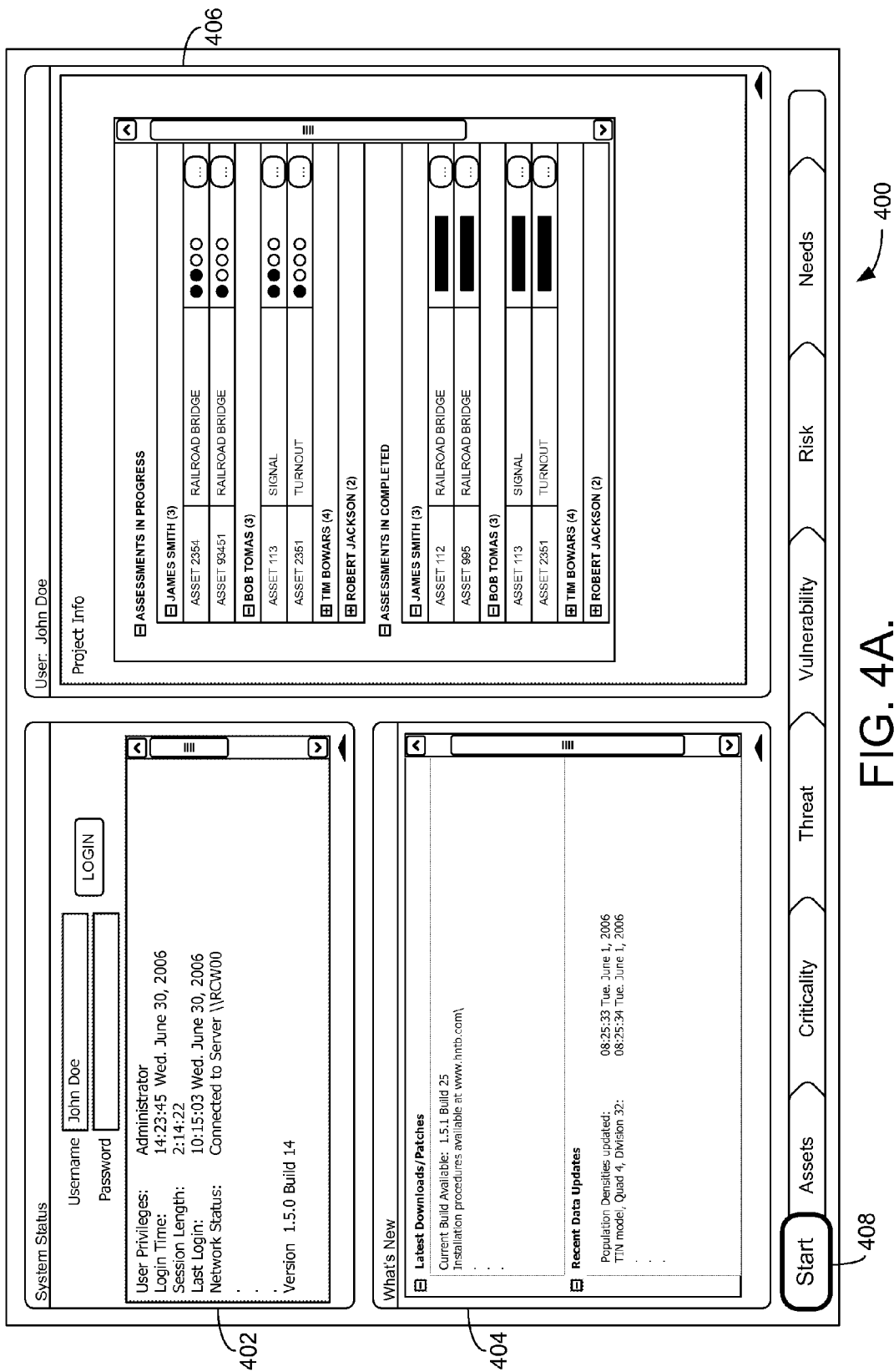
FIGS. 4A-4L are illustrative screen displays showing user interfaces for navigating linear corridors and assessing security risks associated with the linear corridors in accordance with another embodiment of the present invention.

Initially, a user may access the system, as shown in FIG. 4A, via an initial user interface allowing the user to login and view general system information. The user interface may include a system status area 402, in which the user may enter a username and password to login. The system status area 402 may also include a variety of status information, such as user privileges, login time, session length, last login, and network status. A system updates area 404 may also be provided, allowing a user to view information regarding system downloads, builds, and patches that may be available, as well as recent data updates. Additionally, a user project area 406 may be provided to present summary information regarding projects associated with the current user. Further, the user interface may include a process navigation bar 408, which may indicate the user's current position in the assessment process. For example, as shown in FIG. 4A, the user is currently on the "Start" tab. The user may employ the process navigation bar 408 to navigate through the security risk assessment process.

Figure 4B:
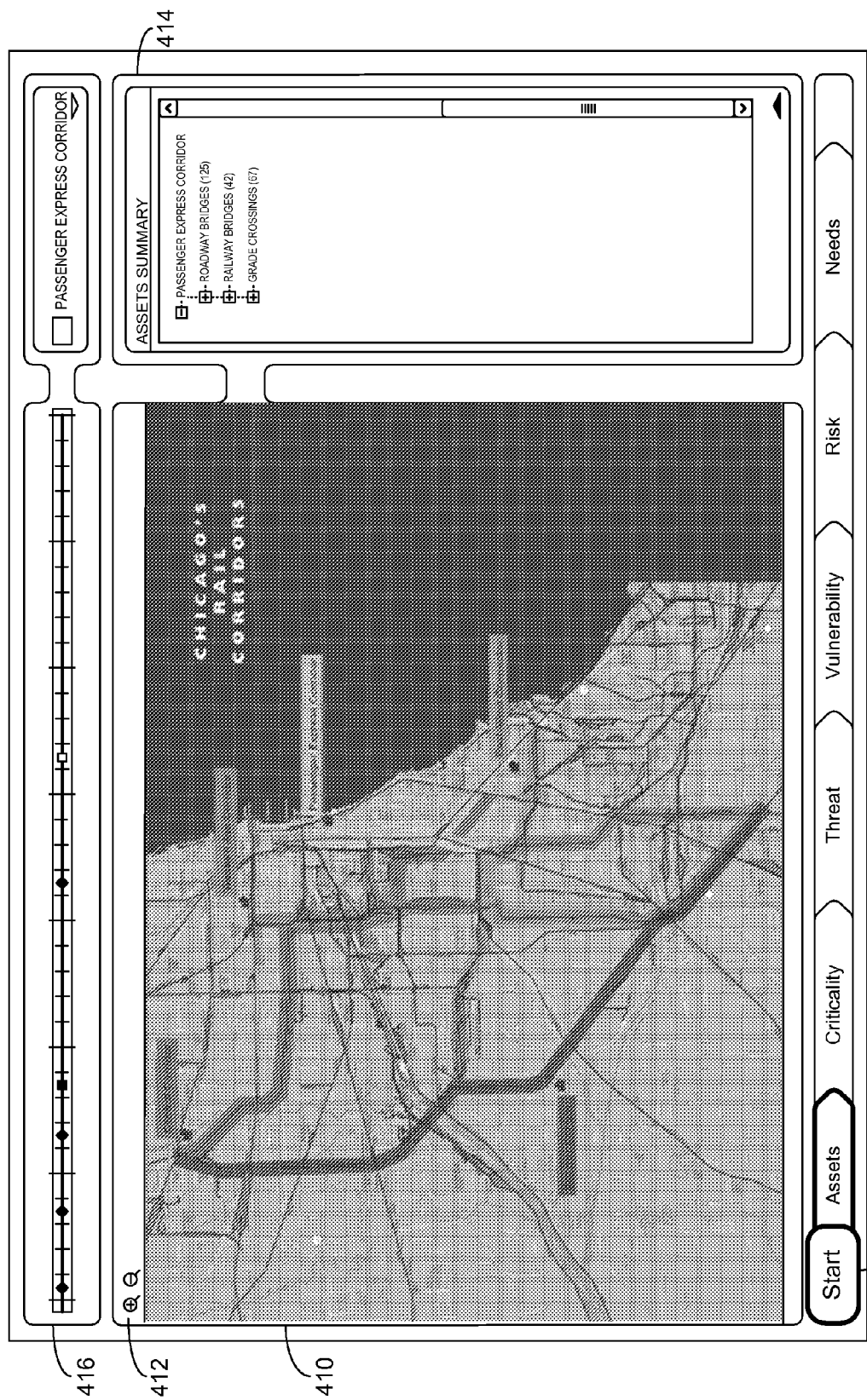

After logging into the system, the user may begin the assessment process. As shown in FIG. 4B, the user has accessed the system and is viewing rail corridors for Chicago. Although only rail corridors are shown in FIG. 4B, it should be understood that the present invention is equally applicable to other types of corridors and is not limited to rail corridors, which are provided herein for illustrative purposes only. A navigation window 410 is provided in the user interface, allowing the user to view a particular area of interest. Geospatial data regarding an area being reviewed may be provided via the navigation window 410.

The user interface may also include an attributes area 414 for presenting information associated with linear corridors, critical assets, and the risk assessment process. For example, in FIG. 4B, when a user first selects a linear corridor for review, an asset summary may be provided in the attributes area 414. The attributes area 414 may further allow users to enter and modify information as will be described in further detail below.

Figure 4C:
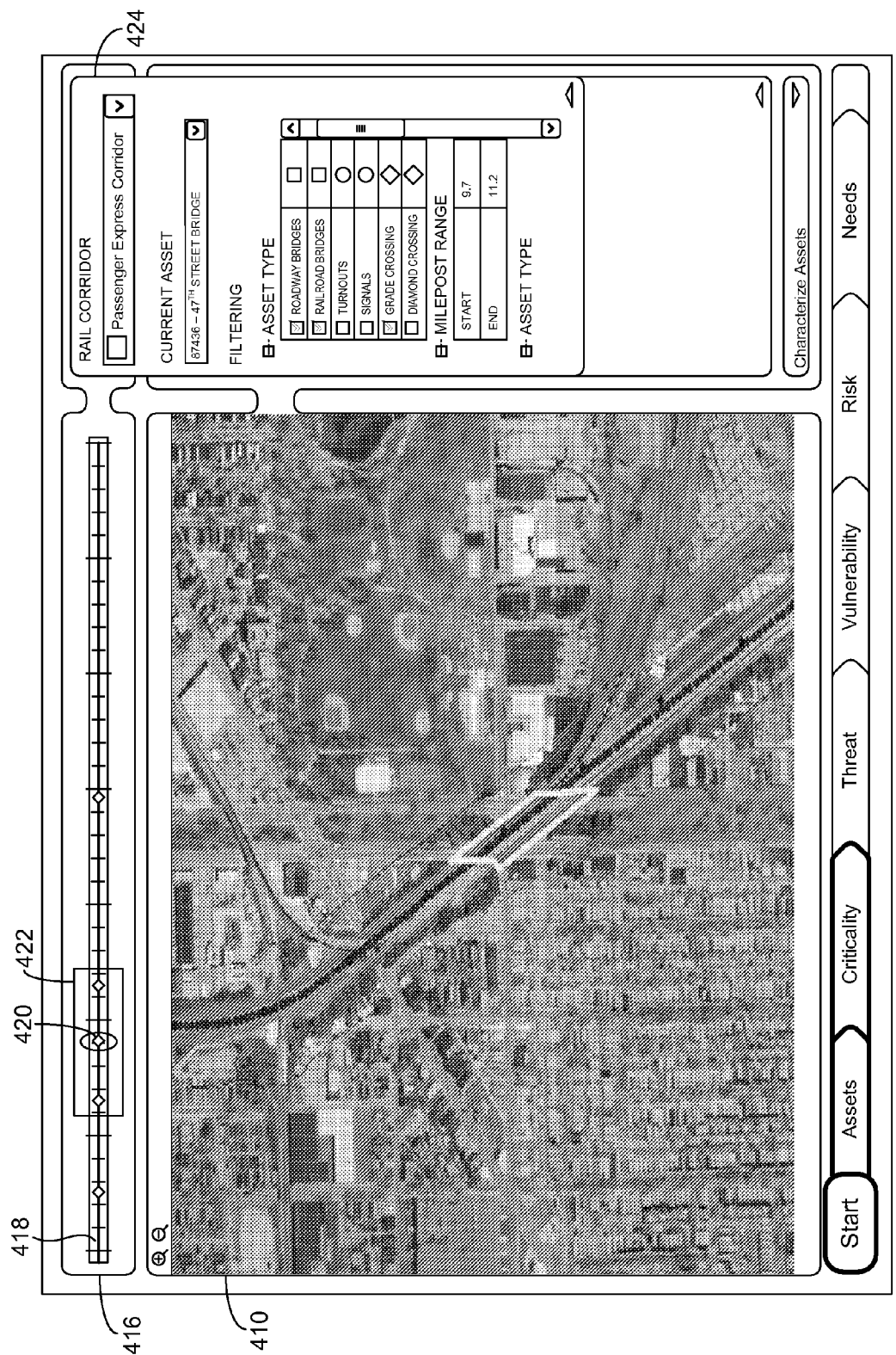

Although a number of tools provided in a tool bar 412 may allow a user to interactively navigate the geospatial data provided in the navigation window 410 (e.g., to zoom in and out of the data), the present embodiments includes a corridor navigation tool 416, which provides a primary navigation mechanism. The corridor navigation tool 416 allows a user to selectively control the image (i.e., the portion of the linear corridor and surrounding area) displayed in the navigation window 410. Referring now to FIG. 4C, further details of the corridor navigation tool 416 will be described. The corridor navigation tool 416 includes a corridor indicator 418, which provides a linear representation of a selected corridor. Critical assets located along a selected corridor may also be represented in the corridor navigation tool 416 using a variety of indicia, such as that shown for critical asset 420. In various embodiments of the present invention, different indicia (e.g., varying colors and shapes) may be provided to represent information associated with each critical asset, such as, for instance, the type of a critical asset or the risk identified for a critical asset. In some embodiments, when a user places a cursor over a critical asset, information, such as an asset identification number, for instance, may be presented (e.g., via a pop-up dialog window).

A user may interactively control the portion of a selected linear corridor (and surrounding area) presented in the navigation window 410 by employing a corridor window 422 provided in the corridor navigation tool 416. A user may move the corridor window 422 along the corridor indicator 418 (e.g., by clicking on the corridor window 422 and sliding the corridor window 422 along the corridor indicator 418), thereby selecting the portion of the corridor to display in the navigation window 410. A user may also control the extent of the corridor displayed in the navigation window 410 by changing the size of the corridor window 422 (e.g., by clicking on an end of the corridor window 422 and moving the end left or right to resize the window 422).

The corridor navigation tool 416 may further include a corridor navigation menu 424, which a user may employ to control various aspects of the corridor navigation tool 416. For example, a user may select the corridor to navigate. In addition, the user may select a particular asset within the selected corridor to which to navigate directly. The corridor navigation menu 424 may also allow the user to filter the asset types shown in the corridor navigation tool 416 and manually enter a milepost range for the corridor window 422. A user may be able to further access and control asset status information, such as graphical settings for the critical assets shown in the corridor navigation tool 416.

Figure 4D:
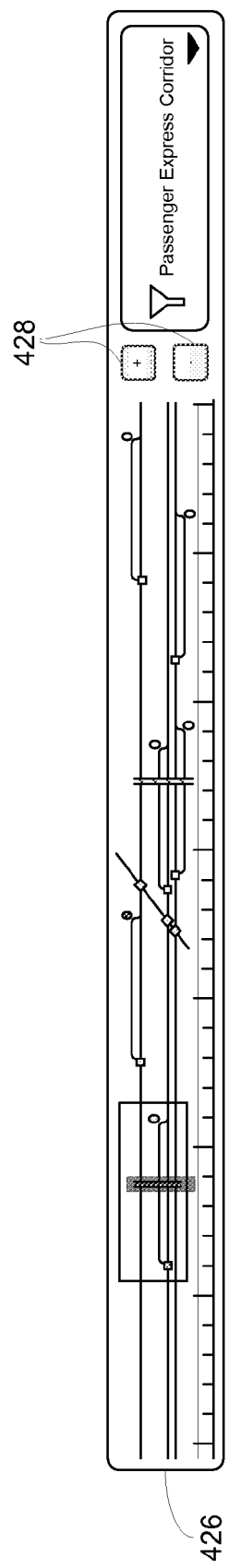

Although the corridor indicator 418 shown in FIG. 4C merely provides a centerline representation of a linear corridor, further embodiments may account for the fact that some linear corridors may be more complex, such as rail corridors having multiple tracks, turnouts, and the like. Such further embodiments may include corridor indicators providing further detail (e.g., show multiple tracks). For example, an alternative corridor navigation tool 426 is illustrated in FIG. 4D. As shown in FIG. 4D, various tracks, turnouts, and the like for a single corridor are provided in the corridor navigation tool. Additional, the approximate location of assets within the corridor may be better represented. The corridor navigation tool 426 further includes buttons 428 allow a user to zoom in and out.

Figure 4E:
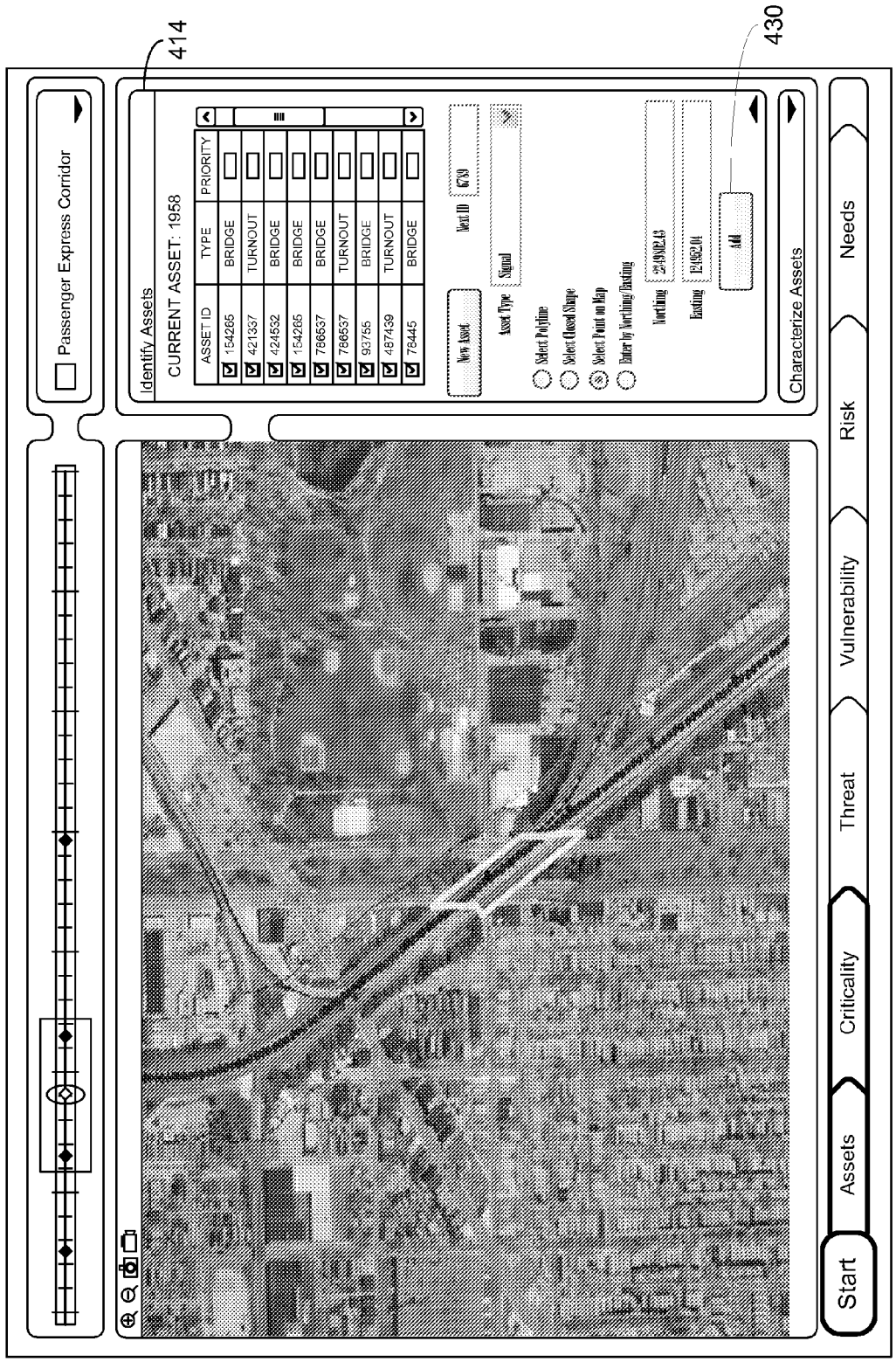

As a user navigates a linear corridor, the user may access various information associated with the corridor. For example, referring to FIG. 4E, the user is currently on the "Criticality" tab in the process navigation bar 408 and is provided asset information via the attributes area 414. Initially, as shown in FIG. 4E, the user is provided an indication of a currently selected critical asset. In addition, a list of critical assets for the selected corridor is indicated, providing summary information, including asset id, type, and priority (i.e., an indication of risk associated with the asset). The attributes area 414 further provides the ability for users to add new assets by providing information, such as type of asset and location, and selecting the "Add" button 430.

Figure 4F:
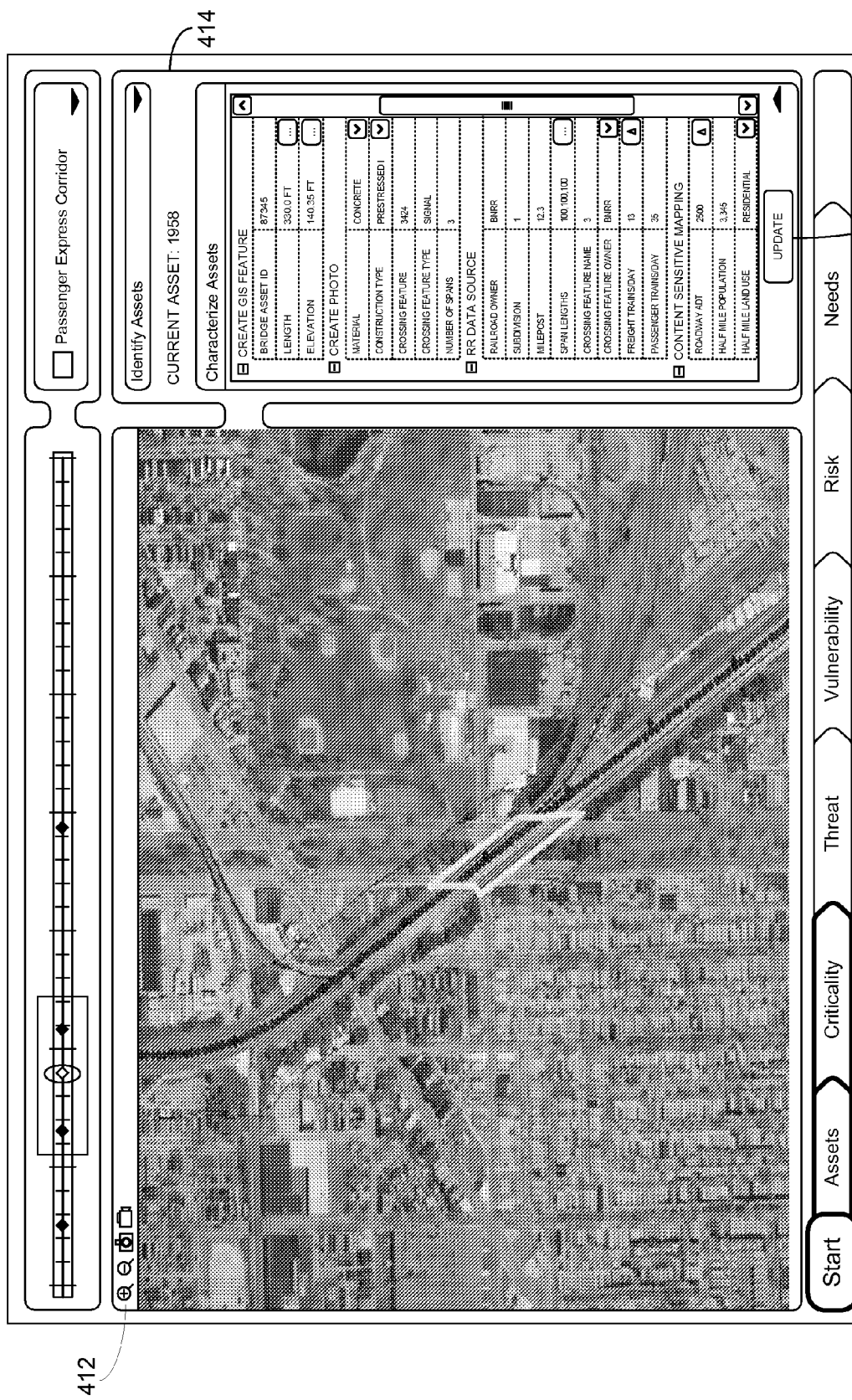

As shown in FIG. 4F, the user may further access detailed information associated with a current critical asset. In some cases, the user may enter and/or adjust values within the data and select an update button 432 to update the data in the system. Using tools provided in the tool bar 412, the user may also access video and still images associated with the current critical asset to view particular details of the asset.

Figure 4G:
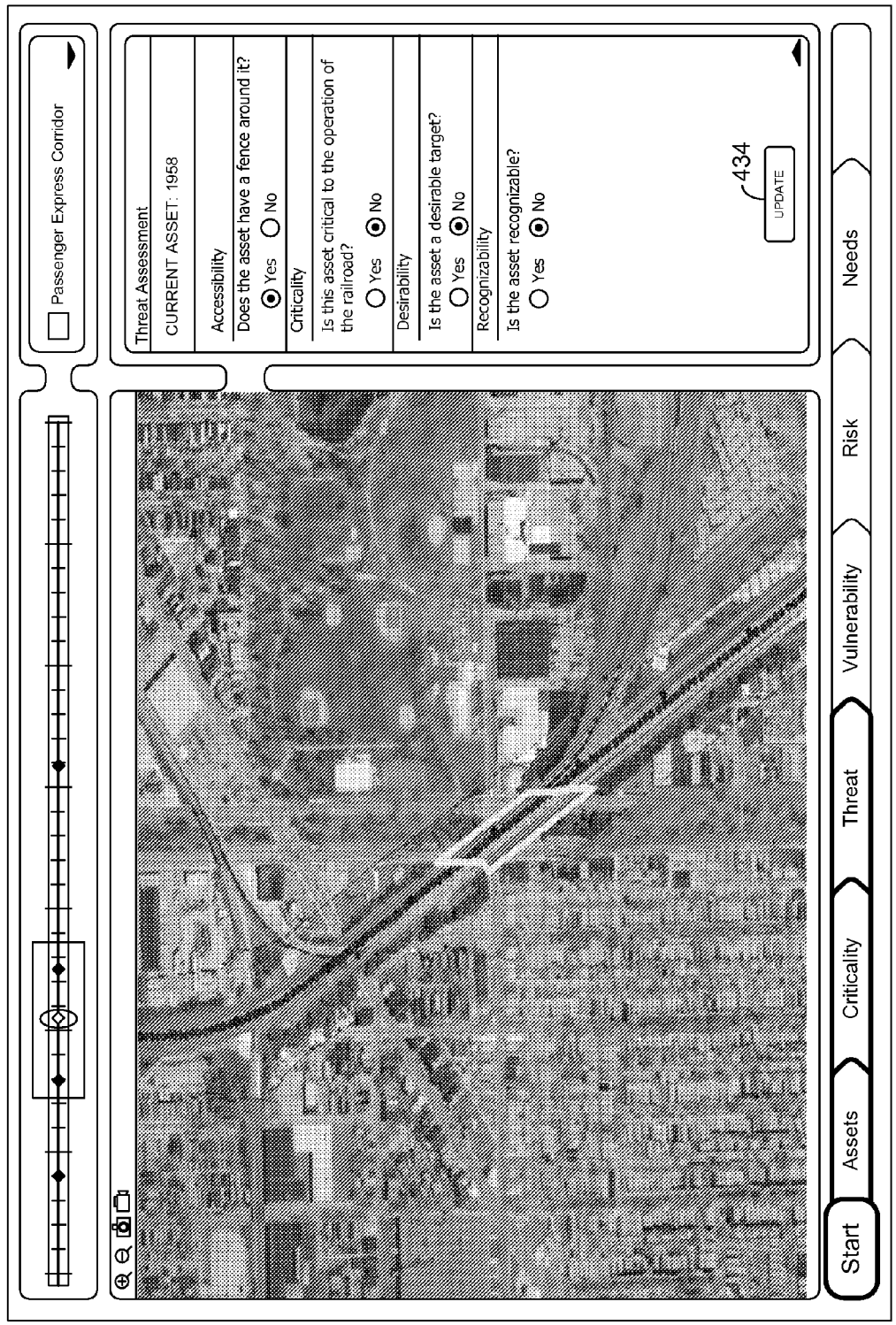

Referring now to FIG. 4G, having reviewed images and data associated with a critical asset, a user may perform a threat assessment for the asset. For example, the assessment may allow the user to provide information as to the accessibility, criticality, desirability, and recognizability of the critical asset. In some cases, such information may be system-determined and presented to the user, who may manually override the system determination. After entering such information or making any modifications, the user may select an update button 434 to update the data in the system.

Figure 4H:
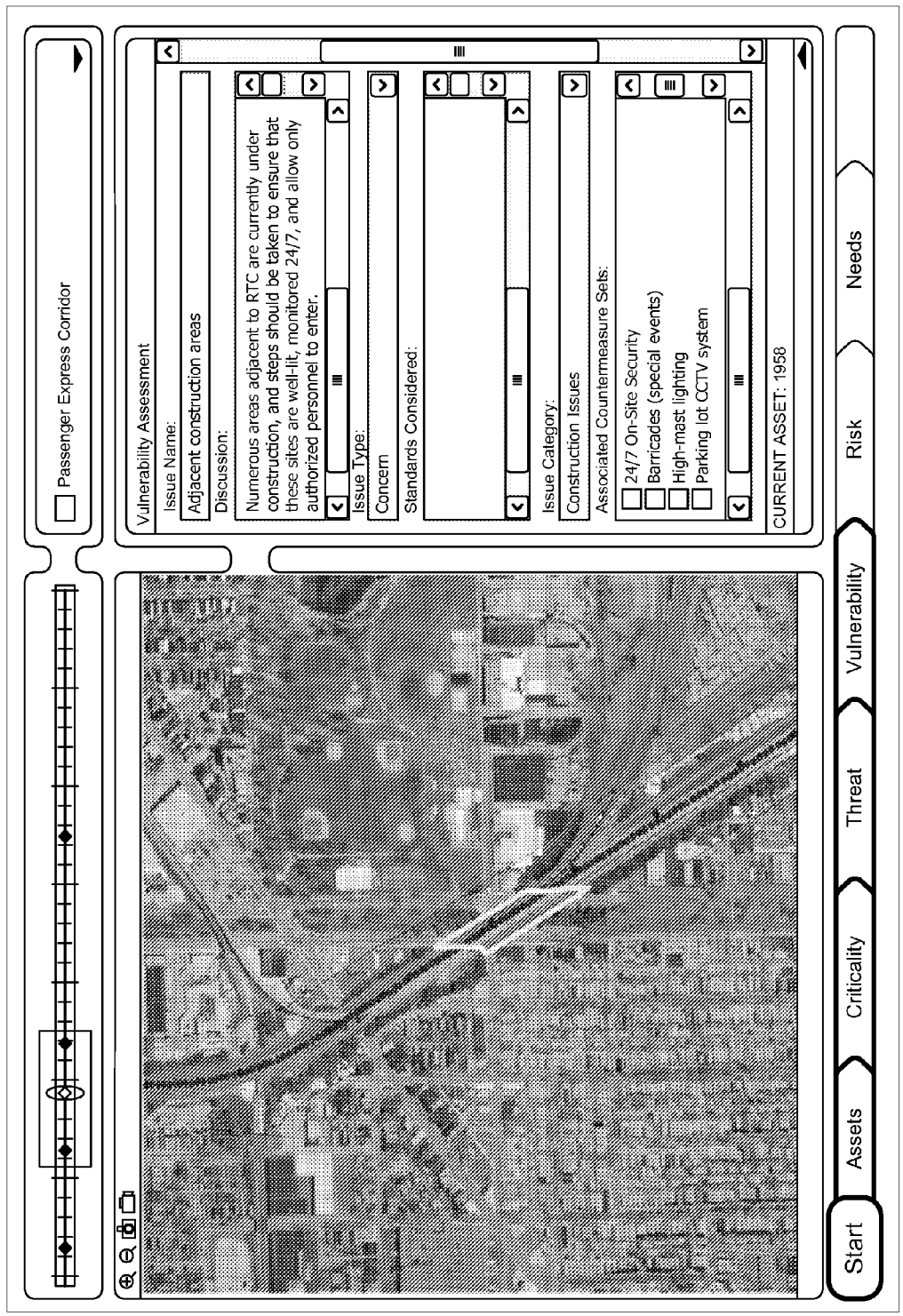

The user may also perform a vulnerability assessment for the current critical asset, as shown in FIG. 4H. The user may identify various issues associated with the asset and enter subjective comments regarding each issue. The user may also identify issue types and categories (e.g., level of concern for each issue) via drop-down menus and may indicate any countermeasures currently in place. Such information may then be used in objective risk determinations.

Figure 4I:
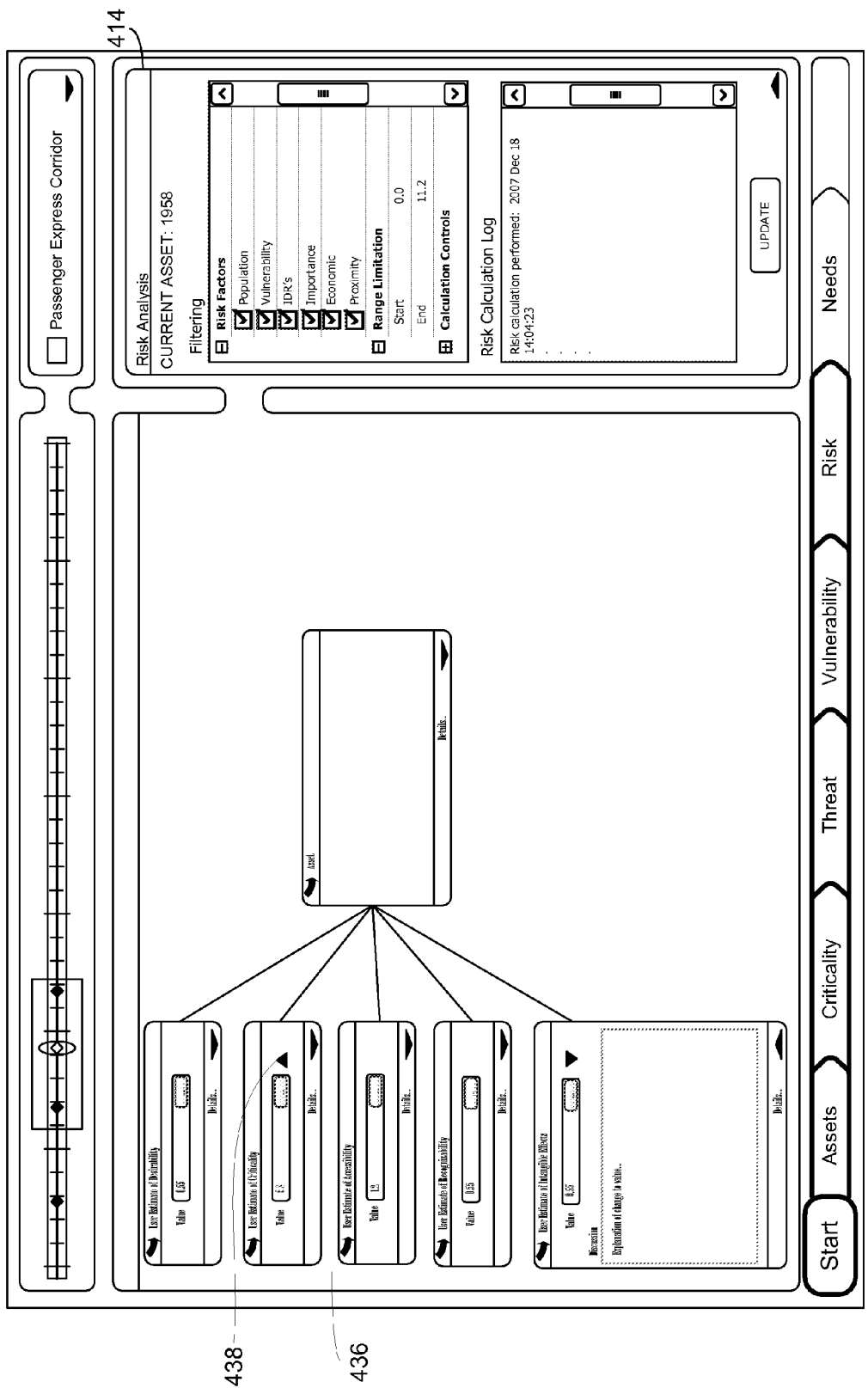

The results of an objective risk assessment for a linear corridor may be represented in a number of ways within various embodiments of the present invention. Referring initially to FIG. 4I, a user interface is illustrated showing the user navigating to the "Risk" tab of the process navigation bar 408. The user interface provides an asset risk summary 436 for a current asset. The summary shown in FIG. 4I provides top-level summary of various categories associated with risk assessment for the current asset, include desirability, criticality, accessibility, recognizability, and intangible effects. An objective risk assessment value that has been calculated is provided for each. In some cases, a user may decide to override a value, and input a different value. In such cases an indication may be provided, such as the indication 438 for criticality, indicating that a user has either raised or lowered a value. In some cases, each of the components shown in the asset risk summary may include indicia, such as color-coding, to provide a quick indication as to a relative level of risk.

Figure 4J:
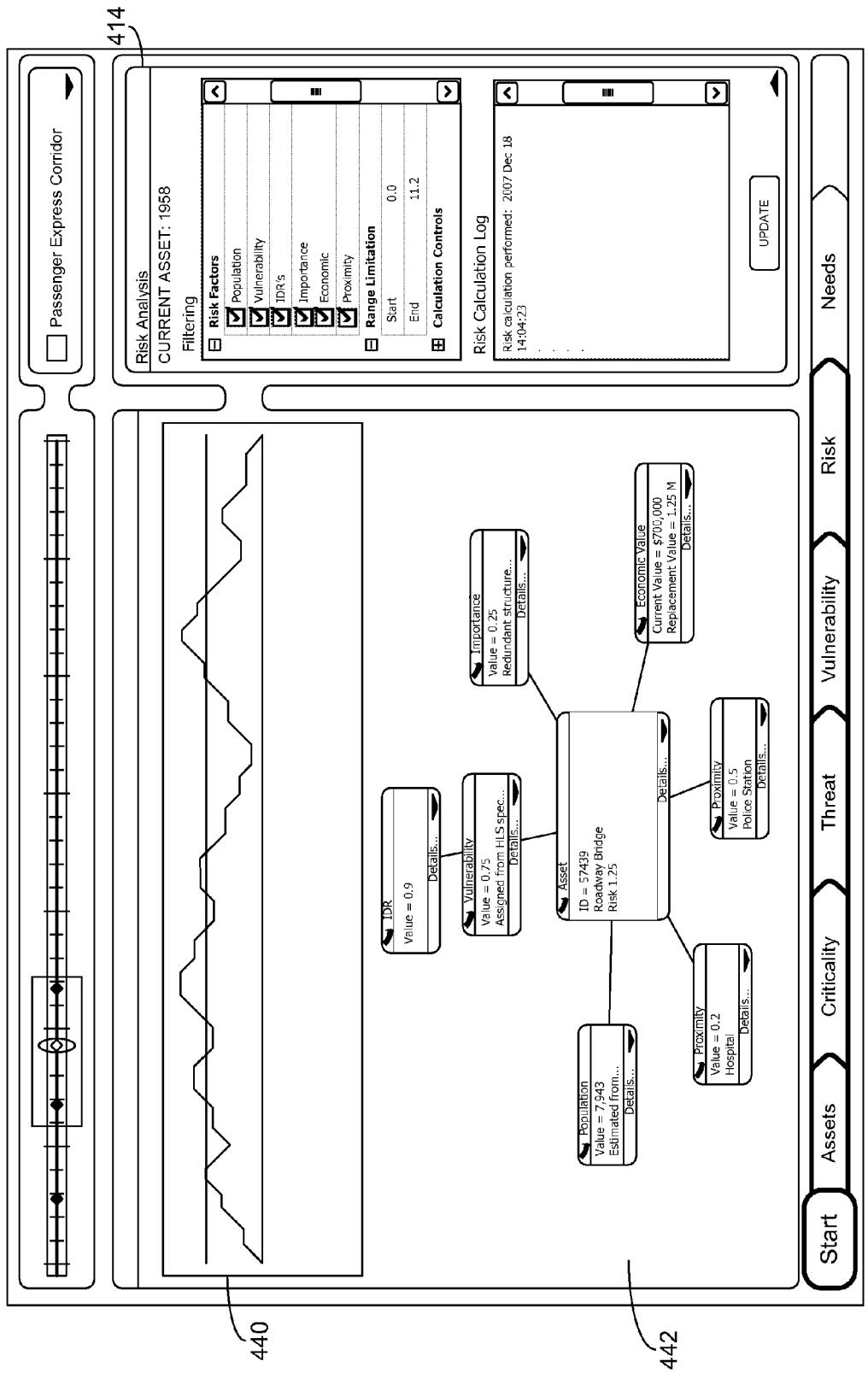

Another user interface showing summary risk information is shown in FIG. 4J. The user interface includes a corridor risk chart 440, which provides a graphical representation of the relative level of risk determined along the selected linear corridor. The user interface also provides an asset risk summary 442 providing more detailed information for a current asset. The asset risk summary 442 provides an indication of an objective risk value that has been determined for the current asset. In addition, the asset risk summary 442 provides a variety of risk factor information associated with the determination of the objective risk value, such as vulnerability, importance, population within a predetermined radius, and proximity to entities, such as a hospital and police station. The attributes area 414 allows the user to filter the risk factors included in the asset risk summary 442. In addition, the attributes area 414 may provide a log indicating when risk calculations were performed.

Figure 4K:
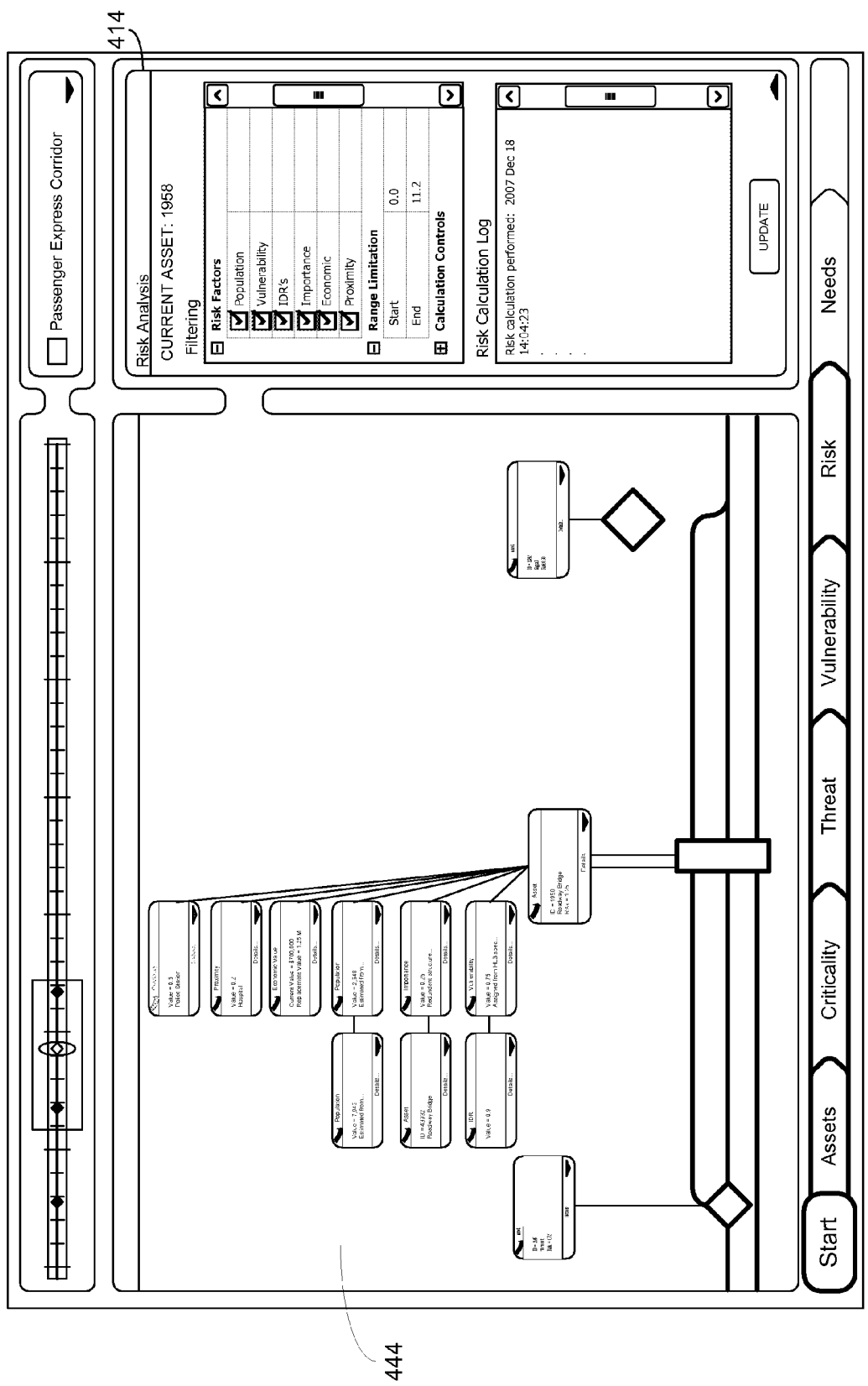

A further user interface showing risk determined for assets along a linear corridor is shown in FIG. 4K. The user interface includes a asset risk summary area 444, that provides a representation of the corridor under review. As such, a use may view details of the corridor (e.g., number of tracks) in conjunction with risk determined for various assets within a window. In addition, detailed risk information may be provided for a currently selected asset.

Figure 4L:
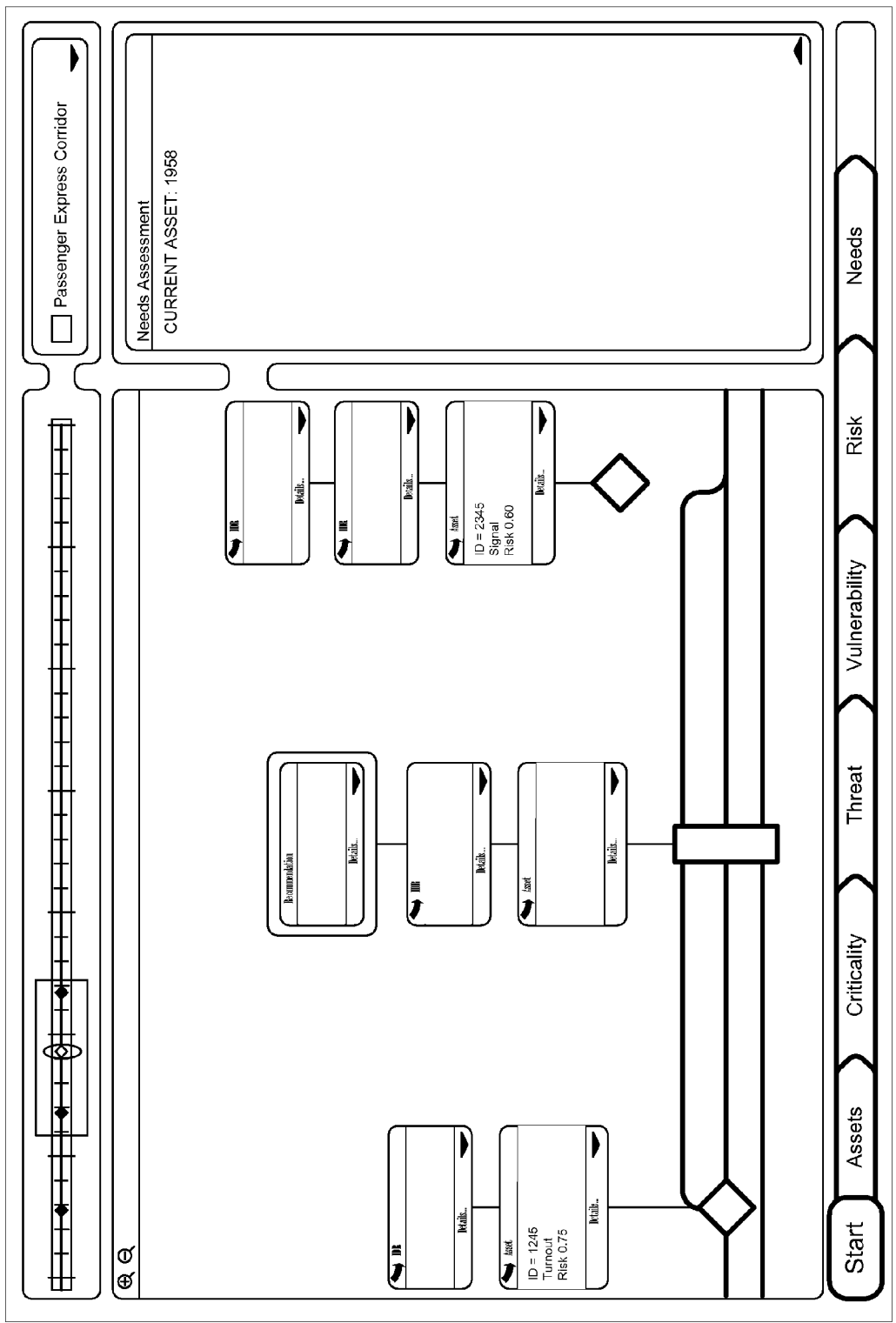

Finally, referring to FIG. 4L, a user may navigate to the "Needs" tab of the process navigation bar 408. Having reviewed the various information and risk calculations that have been performed, the user may enter comments regarding a linear corridor, a specific critical asset, or set of critical assets. For example, the user may enter comments regarding mitigation strategies, response strategies, and recovery strategies. These comments may then be made to other users, for example, to implement improvements to harden a critical asset or access response and recovery strategies in the event of an attack.

Figure 5:
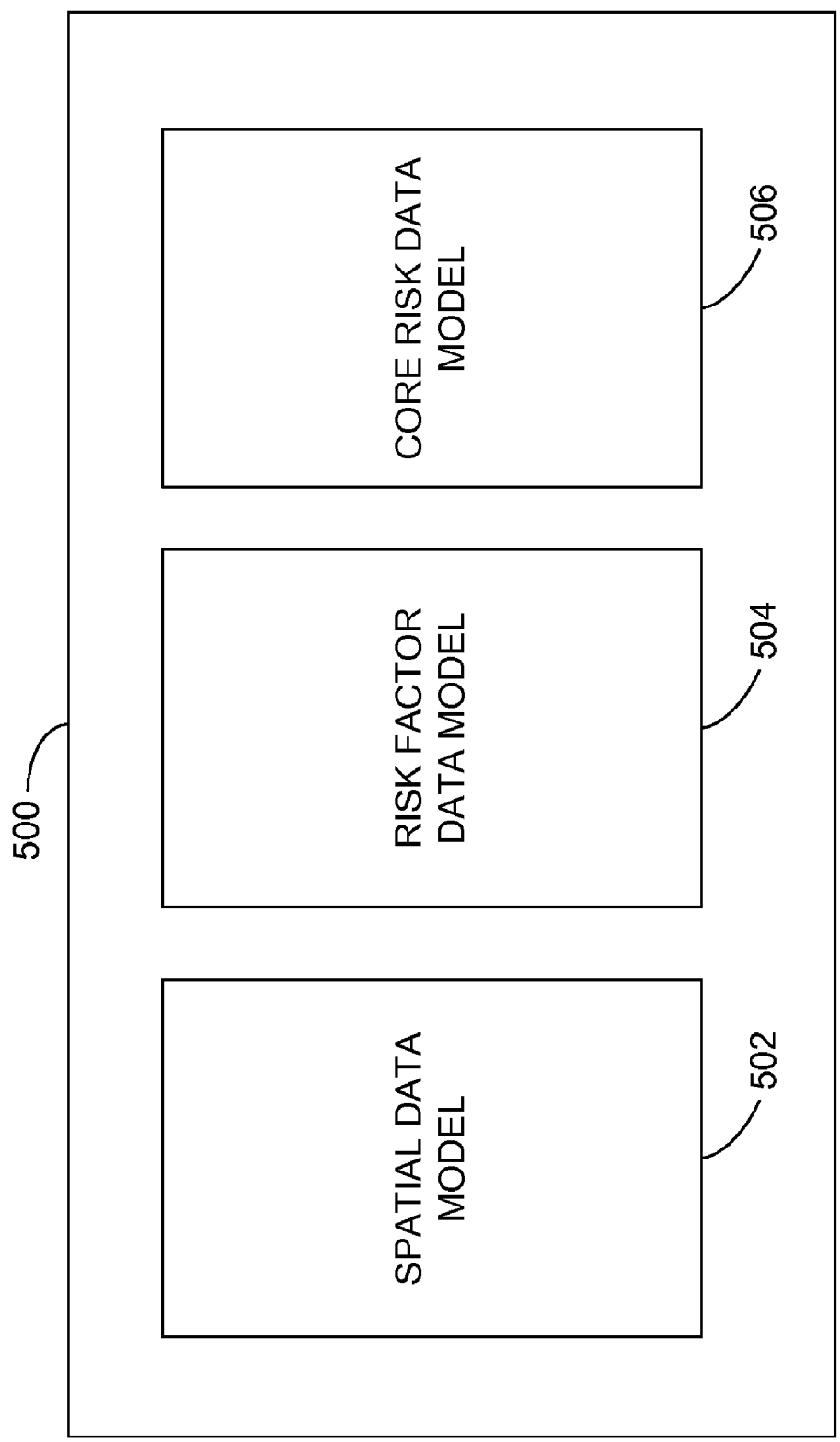
FIG. 5 is a block diagram showing an exemplary data structure for facilitating the assessment of security risks in accordance with an embodiment of the present invention.

The present system is supported by a comprehensive data model that provides detailed geospatial data, core risk analytic support, and risk factors and metrics tailored to specific corridors and asset classes. The data model provides data required to automatically calculate a baseline risk, consistency with standard risk algorithms and methodologies (e.g., Special Needs Jurisdiction Toolkit (SNJTK) and Risk Analysis and Management for Critical Asset Protection (RAM-CAP)), and a model that is extensible and can be easily updated by the user. Accordingly, referring now to FIG. 5, a block diagram is provided showing an exemplary data structure 500 for facilitating the assessment of security risks in accordance with an embodiment of the present invention. As shown in FIG. 5, the data structure comprises a spatial data model 502, a risk factor data model 504, and a core risk data model 506.

The spatial data model 502 contains spatial data that includes geographic data and attributes necessary to describe linear corridors. The spatial data model 502 may comprise a database derived from a variety of sources, including, for example, aerial data acquisition (including, in some embodiments, LIDAR mapping), railroad sources, commercially and freely available GIS sources. The spatial data model 502 may include geospatially referenced linear corridor feature data, high resolution photography and video of linear corridor data, linear corridor data and maps, and GIS data. The compilation of linear corridor asset attribute information and surrounding feature information in the spatial data model 502 enables the evaluation of risk along linear corridors in a repeatable, cost effective, and objective manner.

To facilitate the calculation of risk, the spatial data model 502 includes information identifying critical assets along linear corridors within the spatial data. Additionally, the data identifies each critical asset as within a particular asset class and defines asset attributes for each critical asset. As a specific example, a rail/roadway crossing may be identified as a critical asset along a rail corridor. The specific rail/roadway crossing may be identified as within a rail/roadway crossing asset class. Asset attributes associated with the rail/roadway crossing may include, for example, the number of tracks, number of lanes, average daily traffic, annual tonnage, percentage of hazardous material cars, track speed, signals, grade crossing warning system, adjacent land use, and population.

As a specific example in an embodiment directed to determining risk for rail corridors, a spatial data model was generated that includes data from the CREATE project, which provided an existing geospatially referenced railroad feature data source. Under the project, mapping and GIS data was developed for most of the heavily used freight railroad corridors within the Chicago Terminal District. The process included low altitude, high resolution aerial data acquisition using video, digital photography, and laser technologies. The raw products were processed to obtain mapping in common CAD formats and railroad feature information in GIS format. A spatial data model was built upon the CREATE database, including railroad feature information in a readily useable format for risk assessment. For example, each grade crossing found within the mapped territory can be identified in a grade crossing list. Each grade crossing is tagged with a unique identification and its geospatial coordinates identified in the State Plane coordinate system. Further attributes can then be easily attached by a GIS analyst or otherwise.

The CREATE project also included high resolution photography and video, which minimized the need for railroad property access to perform risk assessment functions. In particular, aerial data was acquired from a helicopter platform at altitudes ranging from 50 to 75 meters. As a result, data density was provided with a 3-inch photographic pixel resolution. The high-resolution still photos were combined into 10 megabyte orthophotos, which enable risk assessment personnel to inspect large site areas in great detail. In addition, the video provides a high resolution fly-by perspective traveling slowly down the track at about 30 feet per second. The data allows for the examination of the railroad environment without having to set foot on the railroad property. This process enables the risk assessment personnel to cover large segments of the railroad quite rapidly in contrast to a physical inspection of the site. In addition, the subject area may be view by multiple personnel in different locations or can be reviewed again and again without requiring a return trip.

In some cases, where the aerial photography and video do not provide sufficient data, site visits would not be precluded, but could be conducted in a more efficient manner, as the initial inspections of the photographic data allows for the identification of specific features requiring closer, physical inspection.

This process provides benefits to railroads (as well as other types of linear corridors), in that most activities are conducted offsite and do not impact the operation of the railroad. Similarly, the process enables risk assessment to be performed in a safe environment, in contrast to often dangerous conditions posed by moving trains in narrow or elevated corridors.

The CREATE project included LIDAR data that enables risk assessment personnel to see the site in all three dimensions. The data includes position information (x, y, z) and intensity. Typically, the data was obtained with a high speed scanner at low altitude, which provides a data density of 20-60 laser hits per square meter. Coloration may be provided to the data based on elevation or intensity. A user may view points from any perspective, allowing risk assessment personnel to inspect a site from any physical location. For example, risk assessment personnel may choose to view railroad assets from the perspective of a terrorist, examining line of sight or ground topography.

A spatial data model for railroad corridors may also correlate railroads' track charts, structure lists, and valuation maps with other geospatial data. Information associated with attributes for railroad assets often resides in railroad-owned databases and may not be directly available by visible inspection. Accordingly, relevant data from railroad-owned databases may be correlated with other data in a spatial data model.

GIS data sources that include land use, population, transportation, and other geospatially referenced features may also be integrated with a spatial data model. Such data facilitates risk assessments that include considerations of the existence and location of adjacent land use, population, and transportation features and venues that attract large numbers of people, for example. Accordingly, a spatial data model may include data provided by commercially and free available data sources.

The risk factor data model 504 contains data representing risk factors that facilitate the calculation of a baseline risk for critical assets along linear corridors. The baseline risk represents the inherent risk associated with a critical asset. In particular, the data within the risk factor data model 504 includes specific risk factors for specific asset classes. Additionally, the data includes risk factors for different asset attributes. Accordingly, a baseline risk for a critical asset may be determined based on its asset class and asset attributes. The risk factors may be based on best practice risk data and expert judgments to provide standard criteria for evaluating risk. As such, the risk factors may be broadly applicable to any linear corridor.

In an embodiment, the risk factors included in the risk factor data model 504 are determined by a panel of risk experts consisting of industry and academia personnel for each specific type of linear corridor. The panel may identify specific classes of assets for linear corridors and relevant asset attributes. Accordingly, in such an embodiment, the panel's determinations may be used to structure the data in the spatial data model 502 by providing indications of asset class and relevant asset attributes within the spatial data. Additionally, the panel may determine risk factors based on each specific class of asset and/or asset attributes. The panel determined risk factors may then be used to generated the risk factor data model 504.

The core risk data model 506 provides an underlying data structure to support core risk calculations. In particular, the data structure includes data for determining core risk for critical assets based on a baseline risk determined using data in the spatial data model 502 and risk factor data model 504.

In an embodiment, the core risk data model 506 includes data to support an analytic risk engine, known as a Rick Influence Network (RIN), that calculates risk and the affect that risk mitigation strategies have on risk. The RIN methodology is an analytic risk methodology that is built on the basic building blocks of terrorism risk management, and incorporates best practices from commercial, defense, intelligence, and homeland security disciplines. The RIN methodology is designed to be implemented in software so that evidence and influencers to risk can be assembled from sources and risk calculated, explicitly accounting for the uncertainty in the data. The RIN methodology is recognized by the Department of Homeland Security as a methodology that successfully implements the metrics of the SNJTK and RAMCAP. Like the RAMCAP philosophy, the RIN methodology features a best-practice core risk methodology and the extensibility to add sector-specific considerations. The RIN analytics produce SNJTK metrics, are compliant with RAMCAP, and have been provide in operational environments throughout the country.

Figure 6:
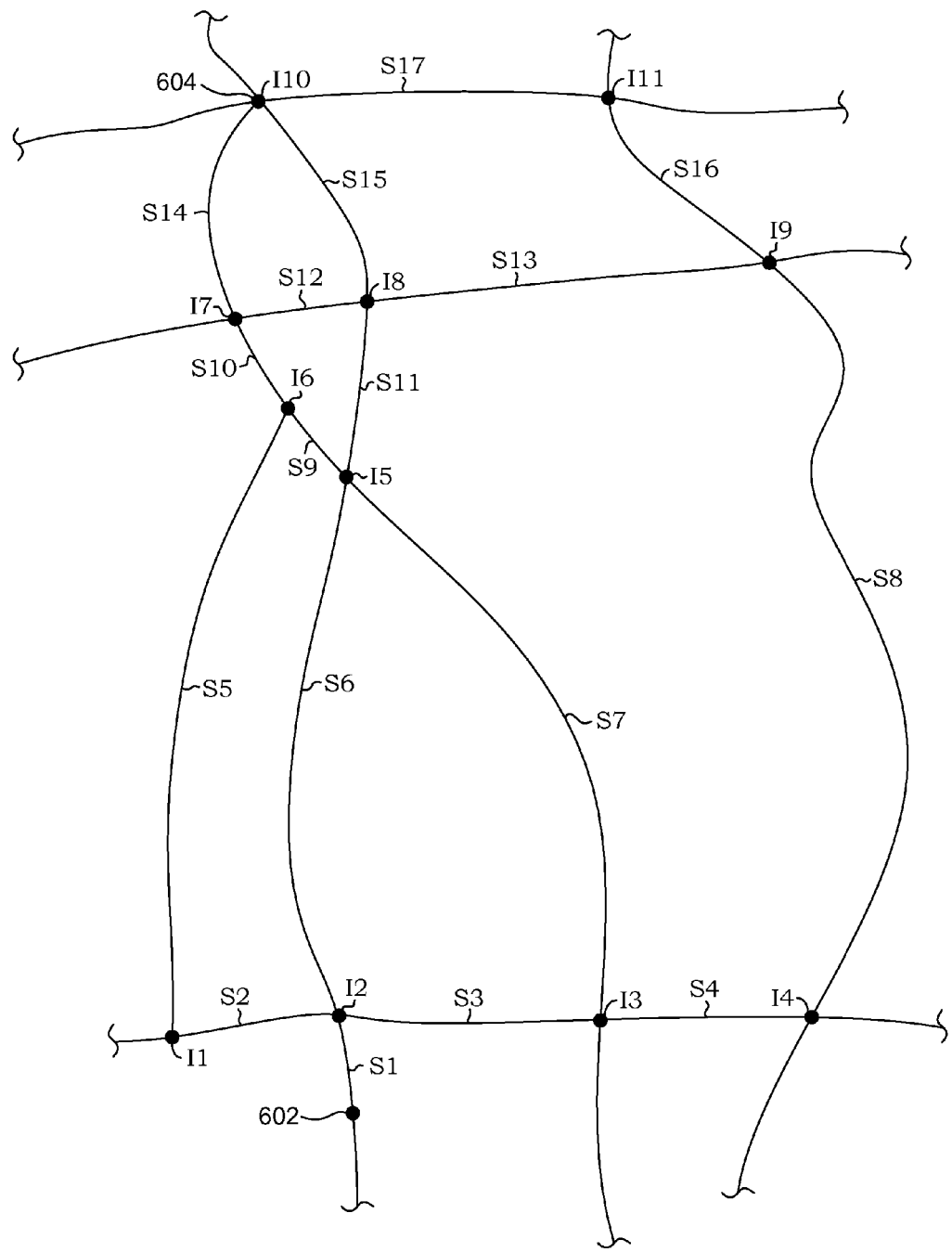
FIG. 6 is a diagram depicting hypothetical rail corridors through an area showing intersections between the rail corridors and rail corridor segments.

As indicated hereinabove, risk assessment of linear corridors in conjunction with detailed geographic, demographic, environmental, and other types of information provided by embodiments of the invention further facilitate a variety of mitigation, event response, planning, preparedness, and recovery strategies. For example, in some embodiments, the present invention facilitates comparative analysis of routes for the transportation of hazardous material. Such analysis may be beneficial, for instance, in determining where to focus linear corridor improvement efforts (e.g., linear corridors to be expanded, strengthened against attacks, etc.). Additionally, such comparative analysis may facilitate the identification of routes having the lowest risk for transporting hazardous materials, thereby dictating routing of hazardous material transports, such as rail cars, tractor trailers, and cargo ships, for example. For instance, FIG. 6 provides an example that depicts hypothetical rail corridors within a particular area. As can be seen from FIG. 6, the rail corridors intersect throughout the area, such that there are a number of intersections, including intersections I1 through I11, and a number of linear corridor segments, including linear corridor segments S1 through S17. As a result, there are a variety of different routes that may be taken to traverse the area. For example, one route between a starting point 602 and ending point 604 includes segments S1, S6, S11, and S15. Another route between the starting point 602 and ending point 604 includes segments S1, S3, S4, S8, S16, and S17. A number of other routes between the starting point 602 and ending point 604 are also available.

Figure 7:
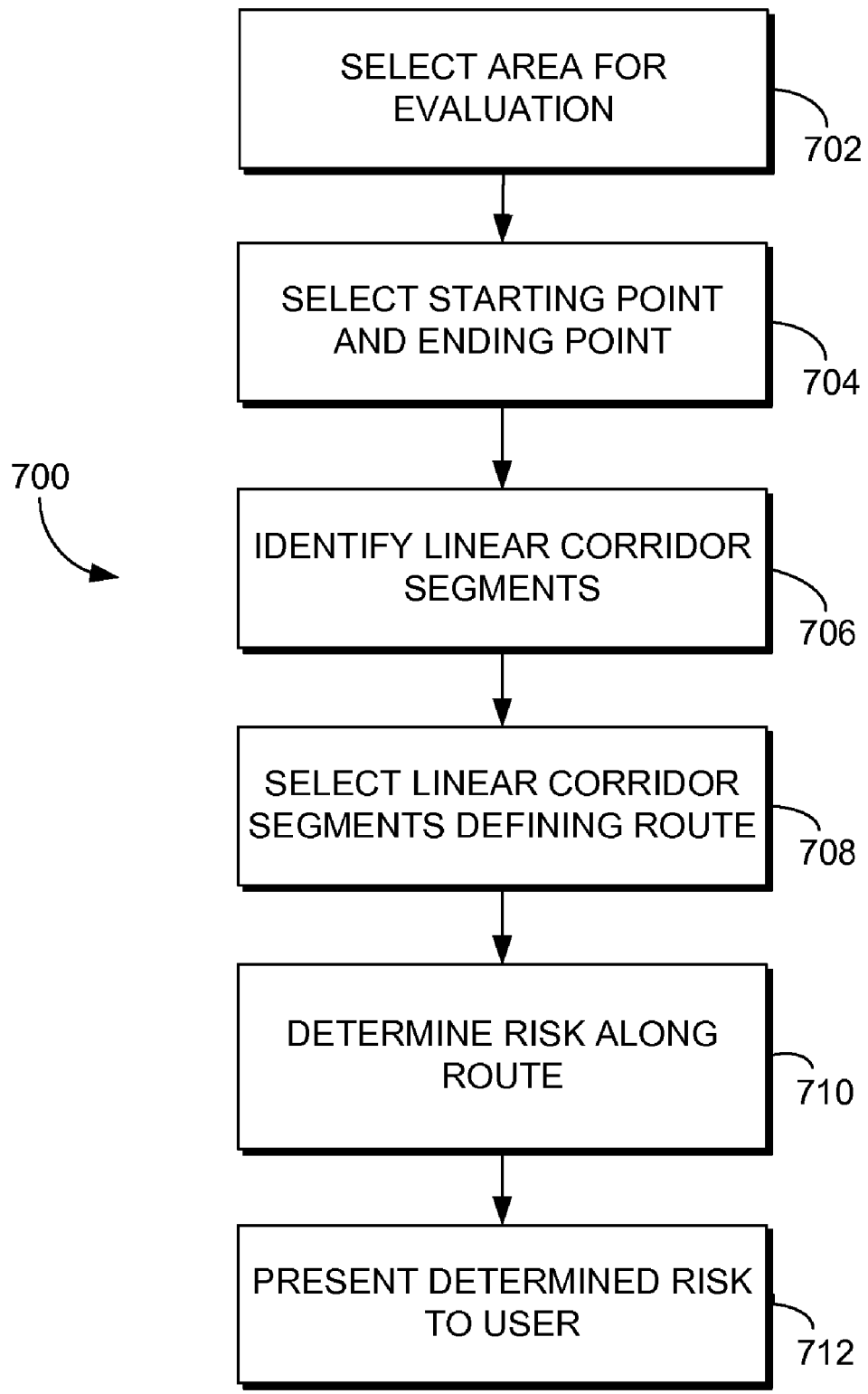
FIG. 7 is a flow diagram showing an exemplary method for assessing risk along a linear corridor route in accordance with an embodiment of the present invention.

Referring now to FIG. 7, a flow diagram is provided illustrating an exemplary method 700 for assessing risk for a linear corridor route in accordance with an embodiment of the present invention. By assessing risk for different linear corridor routes, a comparative analysis of the routes may be provided. As shown at block 702, an area is selected that includes a number of linear corridors. A starting point and ending point are also selected, as shown at block 704. For instance, the area shown in FIG. 6 may be selected, as well as the starting point 602 and ending point 604.

Linear corridor segments are identified within the area, as shown at block 706. In some cases, a linear corridor segment includes a portion of a linear corridor between two intersections without any intermediate intersections (e.g., S2 through S17 in FIG. 6). In other cases, a linear corridor segment includes a portion of a linear corridor between an intersection and either a starting point or an ending point without any intermediate intersections (e.g., S1 between starting point 602 and 12 in FIG. 6).

Linear corridor segments defining a route between a starting point and an ending point are selected, as shown at block 708. In some cases, a user may wish to select a particular route to assess and may manually identify the segments. In other cases, the segments may be automatically selected by the system. As an example of the latter, the system may be employed to automatically identify the risk associated with all possible routes between the starting point and ending point and/or to identify the route that has the lowest level of risk. To do so, the system may automatically determine all possible routes and generate a risk for each of the routes.

As shown at block 710, the risk along the route between the starting point and the ending point is then determined. In an embodiment, the risk for each linear corridor segment within the route is determined and the total risk for the route is determined by combining the risk associated with the linear corridor segments. The calculated risk value or assessment is then presented to a user, as shown at block 712.

In further embodiments, the present invention facilitates event response by determining safe havens for transports carrying hazardous materials, such as rail cars, tractor trailers, and cargo ships, for example. As used herein, the term "safe haven" refers to a location that, due to characteristics of the surrounding area, has a reduced overall risk, is less susceptible to an event that would lead to a release of hazardous material (such as a terrorist attack, natural disaster, or accident, for example) and/or would have a reduced impact if an event that resulted in the release of a hazardous material occurred at the location. For example, when an event occurs that elevates the likelihood of a terrorist attack (e.g., the occurrence of terrorist activity or other event that raises the threat level), safe havens may be determined for transports carrying hazardous materials. Each transport may then be moved to its determined safe haven, thereby reducing its susceptibility to an attack and/or any impact that would result from an attack that involves the transport. Similarly, when a natural disaster occurs or is anticipated, hazardous material transports may be moved to safe havens, thereby safeguarding the transports.

Figure 8:
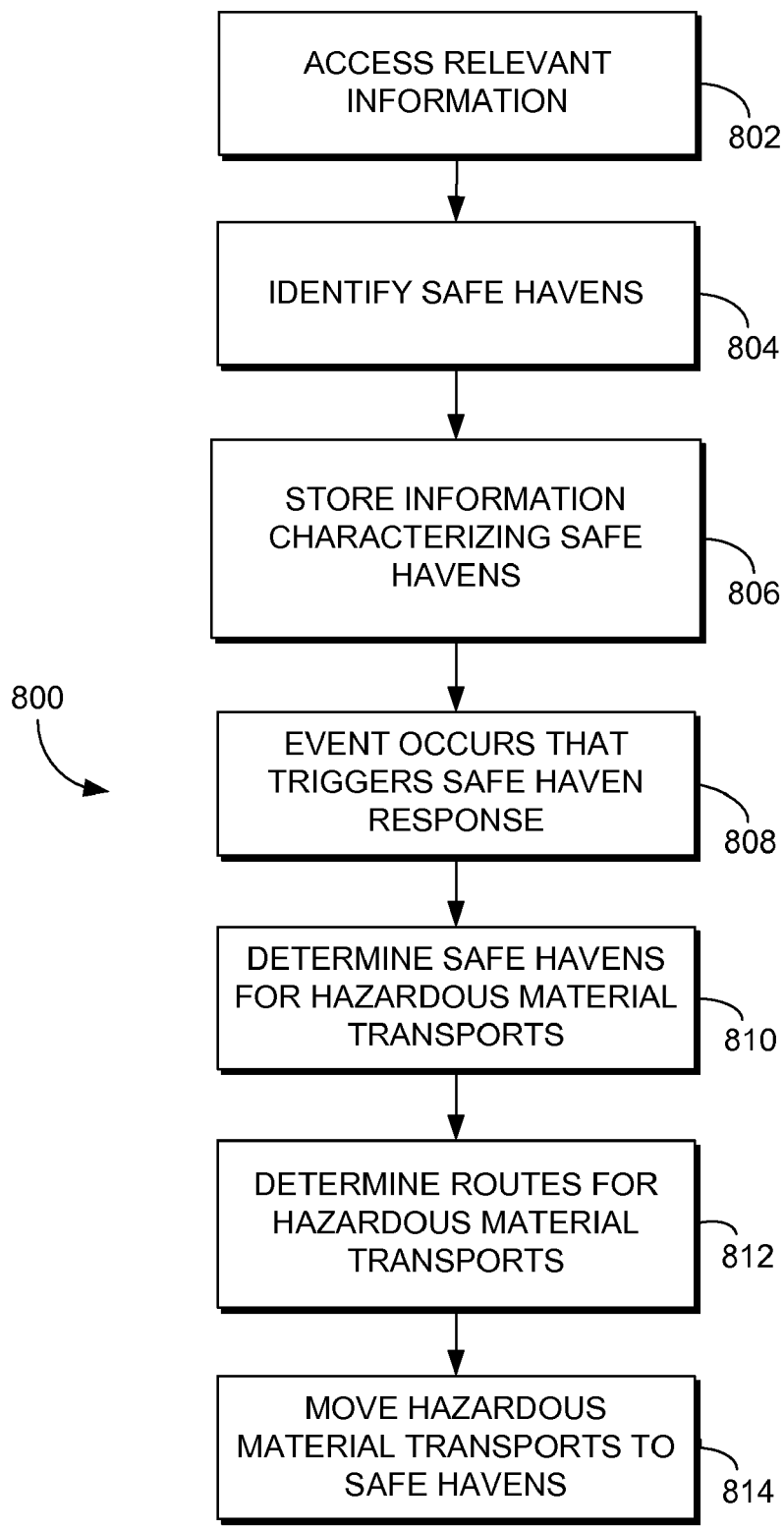
FIG. 8 is a flow diagram showing an exemplary method for identifying safe havens and selecting safe havens for transports carrying hazardous materials in accordance with an embodiment of the present invention.

Referring to FIG. 8, a flow diagram is provided illustrating an exemplary method 800 for identifying safe havens and determining appropriate safe havens for transports carrying hazardous materials in response to an event in accordance with an embodiment of the present invention. The method 800 described with reference to FIG. 8 is directed to an embodiment in which safe havens are predetermined and stored by the system. When an event occurs, a predetermined safe haven may be selected for each hazardous material transport, and the transports are then moved to the selected safe havens.

Initially, as shown at block 802, information relevant for the identification of safe havens is accessed. The information may include the detailed geographic, demographic, environmental, and other types of information aggregated by systems of the present invention. Additionally, the information may include objective risk assessment calculations performed by systems of the present invention. As shown at block 804, safe havens are identified based on the accessed information. Safe havens may be identified using a variety of different information in various embodiments of the present invention. Generally, relevant information relates to a location's susceptibility to an event that would result in a release of hazardous material from a transport (e.g., susceptibility to terrorist activity) and/or the impact a release of a hazardous material from a transport would have at a particular location. By way of example only and not limitation, safe havens may be identified based on: objective risk levels calculated by the system; population density in the surrounding area; proximity of police stations; proximity of fire stations; proximity of military installations; proximity of public waterways that may be affected by hazardous material releases; proximity of other utilities and/or hazardous material storage that may exacerbate the impact of an attack; security; and information specific to the type of linear corridor (e.g., information relevant to a rail corridor may include the number of main tracks, number of side tracks, ownership, signals, type of track, capacity, etc.).

Once safe havens have been identified, information associated with each safe haven is stored by the system, as shown at block 806. Information stored by the system for each safe haven may include an identification of the safe haven, the safe haven's location, and characteristics of the safe haven that are relevant for determining which transports may be routed to the safe haven in response to an event.

At block 808, an event occurs that triggers routing of transports carrying hazardous materials to safe havens. As indicated previously, this may be an event that indicates a greater likelihood that transports carrying hazardous materials could be targeted and/or a greater likelihood of a terrorist attack generally that may be exacerbated by the presence of hazardous material transports. Additionally, the occurrence of a natural disaster or accident and/or the anticipation of a natural disaster (e.g., a hurricane) may be a triggering event. Accordingly, a number of different events may serve as a trigger, such as, for example, some form of terrorist activity, an increased terrorist threat level, a natural disaster, an accident, an the anticipation of a natural disaster.

After an event has occurred that triggers a response that includes routing transports carrying hazardous materials to safe havens, an appropriate safe haven is determined for each transport, as shown at block 810. The determination of an appropriate safe haven for a transport may be based on a variety of factors in accordance with various embodiments of the present invention. Typically, the determination will include a consideration of the location of a hazardous material transport and the location of surrounding safe havens as it may be beneficial to limit the amount of time to get a transport to a safe haven. Accordingly, some embodiments of the present invention may include one or more tracking systems for identifying the location of hazardous material transports. For example, in some embodiments, hazardous material transports may be equipped with GPS devices for locating the transports. In other embodiments, hazardous material transports may be equipped with RFID and RF systems may be employed for tracking the location of the transports.

Other considerations for the determination of an appropriate safe haven for a particular hazardous material transport may include characteristics of the transport and characteristics and capabilities of safe havens to receive hazardous material transports. Relevant characteristics of a hazardous material transport may include the type of hazardous material(s), volume of hazardous material(s), and size of the transport (e.g., the number of rail cars). Relevant characteristics for a safe haven may include the ability to handle certain hazardous materials and its capacity to receive a certain size of transport(s). For example, some safe havens may be better suited to receive certain types of hazardous materials than other safe havens. Additionally, each safe haven will typically have a limit to its capacity. For example, a particular safe haven for a rail corridor may have a limit to the number of rail cars it can receive.

Generally, the system may be used to determine appropriate safe havens for each hazardous material transport by comparing characteristics of each hazardous material transport (e.g., location, hazardous material(s) type/volume, size, etc.) against safe haven characteristics (e.g., capability to handle certain hazardous materials, capacity, risk level associated with safe haven, etc.). However, the determination may also include other considerations. For example, in some embodiments, risk associated with routes required to move a transport from its current location to a safe haven may be a factor in selecting a safe haven for a hazardous material transport. For instance, it may be preferable to select a safe haven that is further away from a hazardous material transport than another safe haven if the route to the further safe haven has a lower overall risk (e.g., the route to the closer safe haven may include a dense population area while the route to the further safe haven may include little to no population). The method 700 described above may be used, for example, in the comparative analysis of routes. In further embodiments, the system may be able to coordinate the selection of safe havens for all hazardous material transports within a particular area. This may help to ensure that multiple hazardous material transports are not all routed to the same safe haven, thereby overloading the safe haven.

In some cases, there may be multiple routes available for moving a hazardous material transport from its current location to a safe haven. Accordingly, in some embodiments, such as that shown in FIG. 8, after determining an appropriate safe haven for a hazardous material transport, a route may be determined for moving the transport to the safe haven, as shown at block 812. The method 700 described above may be employed to perform a comparative analysis of the possible routes. Generally, the system selects the route having the lowest level of risk as determined by objective risk calculations.

Finally, as shown at block 814, each hazardous material is moved from its current location to its determined safe haven. Any routes determined for hazardous material transports at block 812 may be employed.

In some embodiments, a location that has not been predetermined as a safe haven may be selected and designated as a safe haven for a hazardous material transport after an event occurs. For example, an embodiment may include a system in which safe havens are not predetermined, but where locations are dynamically designated as safe havens for hazardous material transports after an event occurs. In other embodiments, a system may include predetermined safe havens but may also be able to dynamically identify other locations that can be used as safe havens for hazardous material transports after an event occurs. For example, in some cases, there may be an event in which it is either impractical or impossible to route a particular transport to any predetermined safe haven. In such cases, the system may determine the safest location for the transport and designate that location as a safe haven.

Figure 9:
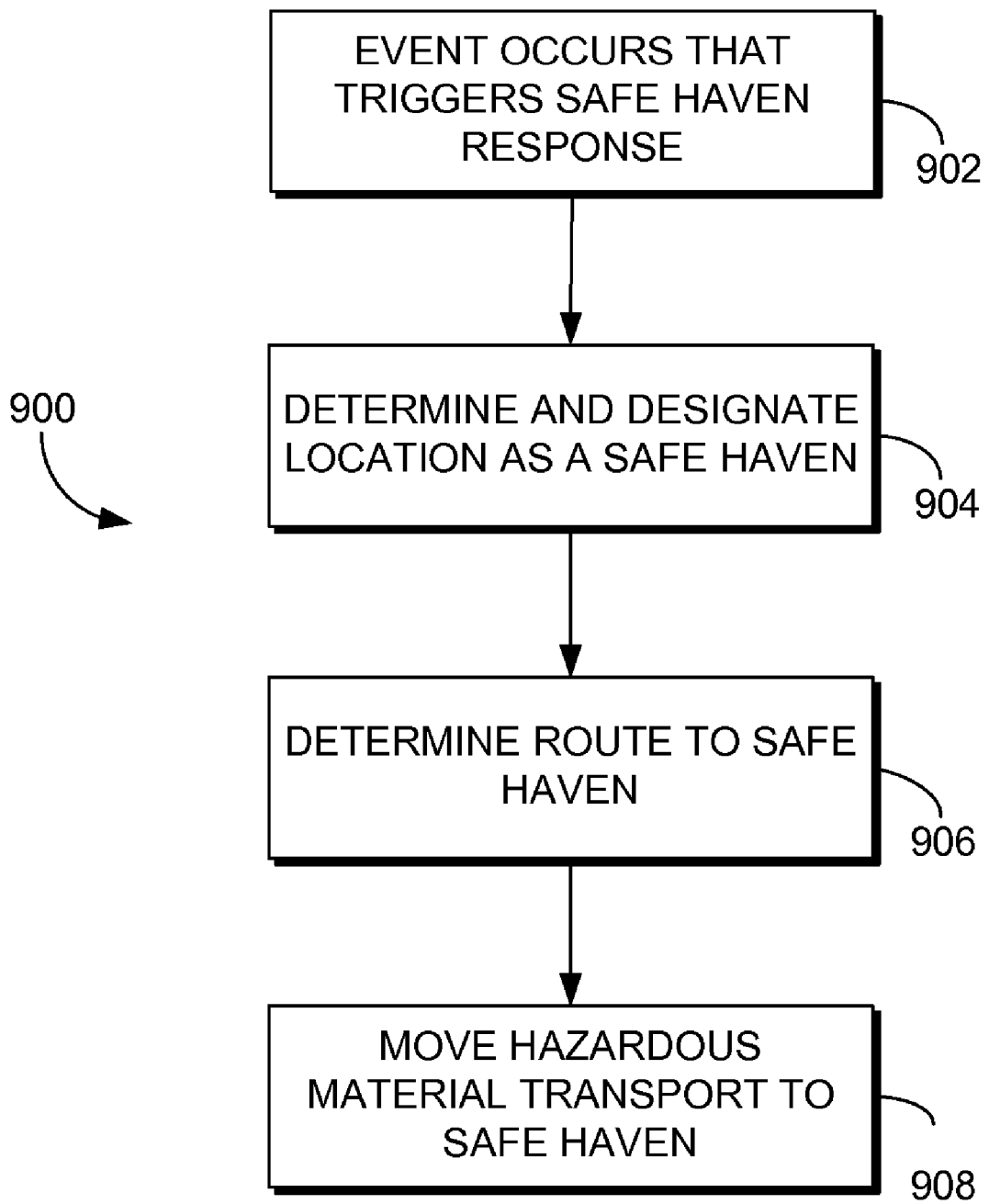
FIG. 9 is a flow diagram showing an exemplary method for identifying safe havens and selecting safe havens for transports carrying hazardous materials in accordance with another embodiment of the present invention.

Referring to FIG. 9, a flow diagram is provided showing an exemplary method 900 for dynamically identifying a location as a safe haven for a hazardous material transport in response to an event in accordance with an embodiment of the present invention. Initially, as shown at block 902, an event occurs that requires a response that includes routing hazardous material transports to safe havens. As noted above, a variety of different events may trigger such a response, including, for example, terrorist activity and/or a heightened threat level, natural disasters, etc.

In response to the event, a location is dynamically determined and designated as a safe haven for a hazardous material transport, as shown at block 904. In comparison with the method 800 in which a predetermined safe haven is selected for a hazardous material transport, in the present embodiment, a location that has not been predetermined as a safe haven is determined to be the safest place for the hazardous material transport and is designated as a safe haven for the hazardous material transport. The information discussed above as being relevant to the identification of safe havens and the determination of appropriate safe havens for particular hazardous material transports is also relevant to the determination at block 904. Generally, a location having a reduced level of risk is selected by comparing characteristics of the hazardous material transport with information associated along linear corridors in the vicinity of the hazardous material transport.

As in the method 800 described above with reference to FIG. 8, in the present embodiment, a route may be determined to move the hazardous material transport from its current location to the determined safe haven, as shown at block 806. Finally, as shown at block 808, the hazardous material transport is moved to the safe haven using a determined route.

As can be understood, embodiments of the present invention provide methods, systems, and user interfaces facilitating the assessment of security risks associated with linear corridors. Additionally, embodiments of the present invention facilitate mitigation, event response, planning, preparedness, and recovery strategies. Some embodiments facilitate comparative analysis of routes for hazardous material transports. Further embodiments facilitate determination of safe havens for hazardous material transports in response to an event indicating a likelihood that hazardous material transports may be attacked or otherwise susceptible to an event that may result in a release of hazardous material (e.g., natural disasters, etc.). The present invention has been described in relation to particular embodiments, which are intended in all respects to be illustrative rather than restrictive. Alternative embodiments will become apparent to those of ordinary skill in the art to which the present invention pertains without departing from its scope. For example, the need for safe havens has been discussed above in one embodiment in connection with terrorist threats. However, the present invention could be used in other instances where hazardous material transports might need to be moved along a linear corridor to a safer location. For example, an impending natural disaster might be an event that triggers a safe haven response as described herein. In such case, safe havens would be determined at least in part based on their ability to act as a better location for the hazardous material transport during the natural disaster. Other events where movement of hazardous materials from a current location to a second location that would result in a reduced risk to individuals or infrastructure are contemplated by and within the scope of the present invention.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A method for providing a safe haven for hazardous material transports in response to an event, the method comprising:
   providing a data store that includes data representative of at least two safe havens with a reduced risk for release of stored hazardous materials, wherein the data includes characteristics of each safe haven, and wherein the characteristics of each safe haven include,
   (A) a location of the safe haven,
   (B) a suitability of the safe haven to receive one or more types of hazardous materials,
   (C) a capacity of the safe haven to store a certain volume of one or more hazardous materials,
   (D) a capacity of the safe haven to receive a certain size of one or more hazardous material transports,
   (E) a susceptibility of the safe haven to an event that would result in release of a hazardous material from the safe haven, and
   (F) an impact of a release of a hazardous material from the safe haven;
   determining characteristics of at least two hazardous material transports, wherein the characteristics of each hazardous material transport include,
   (G) a location of the hazardous material transport,
   (H) a type of hazardous material carried by the hazardous material transport,
   (I) a volume of hazardous material carried by the hazardous material transport, and
   (J) a size of the hazardous material transport; and
   in response to an event, for each hazardous material transport associated with the event,
   determining a route risk value for each safe haven, wherein said route risk value is based in part on population density and is the lowest risk value among all possible routes from the hazardous material transport to the safe haven; and
   determining an optimal safe haven among the at least two safe havens based on the determined route risk values, a comparison between characteristics (A) and (G), a comparison between characteristics (B) and (H), a comparison between characteristics (C) and (I), a comparison between characteristics (D) and (J), said susceptibility of the safe haven to an event that would result in release of a hazardous material from the safe haven, said impact of a release of a hazardous material from the safe haven, and a capability of each safe haven to accommodate multiple hazardous material transports.

2. One or more nontransitory computer-readable media having embodied thereon computer-useable instructions that, when executed, perform a method for providing a safe haven for hazardous material transports in response to an event, the method comprising:
   providing a data store that includes data representative of at least two safe havens with a reduced risk for release of stored hazardous materials, wherein the data includes characteristics of each safe haven, and wherein the characteristics of each safe haven include,
   (A) a location of the safe haven,
   (B) a suitability of the safe haven to receive one or more types of hazardous materials,
   (C) a capacity of the safe haven to store a certain volume of one or more hazardous materials,
   (D) a capacity of the safe haven to receive a certain size of one or more hazardous material transports, (E) a susceptibility of the safe haven to an event that would result in release of a hazardous material from the safe haven, and
(F) an impact of a release of a hazardous material from the safe haven;

determining characteristics of at least two hazardous material transports, wherein the characteristics of each hazardous material transport include,
(G) a location of the hazardous material transport,
(H) a type of hazardous material carried by the hazardous material transport,
(I) a volume of hazardous material carried by the hazardous material transport, and
(J) a size of the hazardous material transport; and in response to an event, for each hazardous material transport associated with the event, determining a route risk value for each safe haven, wherein said route risk value is based in part on population density and is the lowest risk value among all possible routes from the hazardous material transport to the safe haven; and determining an optimal safe haven among the at least two safe havens based on the determined route risk values, a comparison between characteristics (A) and (G), a comparison between characteristics (B) and (H), a comparison between characteristics (C) and (I), a comparison between characteristics (D) and (J), said susceptibility of the safe haven to an event that would result in release of a hazardous material from the safe haven, said impact of a release of a hazardous material from the safe haven, and a capability of each safe haven to accommodate multiple hazardous material transports.

3. A system for providing a safe haven for hazardous material transports in response to an event, the method comprising:

a data store, including one or more nontransitory computer-readable media, that stores data representative of at least two safe havens with a reduced risk for release of stored hazardous materials, wherein the data includes characteristics of each safe haven, and wherein the characteristics of each safe haven include,
(A) a location of the safe haven,
(B) a suitability of the safe haven to receive one or more types of hazardous materials,
(C) a capacity of the safe haven to store a certain volume of one or more hazardous materials,
(D) a capacity of the safe haven to receive a certain size of one or more hazardous material transports,
(E) a susceptibility of the safe haven to an event that would result in release of a hazardous material from the safe haven, and
(F) an impact of a release of a hazardous material from the safe haven;

a first processor-based component that determines characteristics of at least two hazardous material transports, wherein the characteristics of each hazardous material transport include,
(G) a location of the hazardous material transport,
(H) a type of hazardous material carried by the hazardous material transport,
(I) a volume of hazardous material carried by the hazardous material transport, and
(J) a size of the hazardous material transport; and a second processor-based component that, in response to an event, for each hazardous material transport associated with the event,
determines a route risk value for each safe haven, wherein said route risk value is based in part on population density and is the lowest risk value among all possible routes from the hazardous material transport to the safe haven; and a third processor-based component that determines an optimal safe haven among the at least two safe havens based on the determined route risk values, a comparison between characteristics (A) and (G), a comparison between characteristics (B) and (H), a comparison between characteristics (C) and (I), a comparison between characteristics (D) and (J), said susceptibility of the safe haven to an event that would result in release of a hazardous material from the safe haven, said impact of a release of a hazardous material from the safe haven, and a capability of each safe haven to accommodate multiple hazardous material transports.

* * * * *